US008921762B2

(12) United States Patent
Nakaie et al.

(10) Patent No.: US 8,921,762 B2
(45) Date of Patent: Dec. 30, 2014

(54) DETECTION DEVICE HAVING DETACHABLY ATTACHED PLURAL UNITS AND IMAGE FORMING APPARATUS HAVING THE SAME

(75) Inventors: Katsuhiko Nakaie, Kanagawa (JP); Masao Ito, Kanagawa (JP); Fumio Furusawa, Kanagawai (JP); Junichi Morooka, Kanagawa (JP); Shusaku Yokota, Kanagawa (JP); Kota Ninomiya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 796 days.

(21) Appl. No.: 13/088,998

(22) Filed: Apr. 18, 2011

(65) Prior Publication Data
US 2012/0099884 A1 Apr. 26, 2012

(30) Foreign Application Priority Data

Oct. 22, 2010 (JP) .................................. 2010-238004

(51) Int. Cl.
*H01J 5/02* (2006.01)
*H01L 27/00* (2006.01)
(Continued)

(52) U.S. Cl.
CPC ........ *G03G 15/5062* (2013.01); *H04N 1/00013* (2013.01); *H04N 1/00031* (2013.01); *H04N* (Continued)

(58) Field of Classification Search
CPC .................. G03G 2221/16; G03G 2221/1636; G03G 2221/1654; G03G 2221/183; G03G 15/326; G03G 2221/1651; G03G 2221/1642; G03G 2221/1684; G03G 15/5062; G03G 21/1623; G03G 2221/1678; H01L 31/0203; H01L 27/14618; H01L 31/0232; H01L 27/14625; H04N 1/00519; H04N 1/00538; H04N 1/00541; H04N 1/00557; H04N 1/00; H04N 1/0249; H04N 1/02454; H04N 1/00559; H04N 1/125; H04N 1/00087; H04N 1/00063; H04N 1/0305; H04N 1/00013; H04N 1/00045; H04N 1/00031; H04N 2201/0082; H04N 1/123; H04N 2201/02402
USPC ............... 250/208.1, 221, 216, 239; 358/501, 358/513, 509, 505, 1.15, 1.13, 1.19, 474, 358/498, 449, 496, 482, 471; 399/14, 15, 399/16, 200, 201, 202; 347/129, 134, 138, 347/139, 152, 153, 170, 222; 359/726, 727, 359/730, 811, 818; 101/131
See application file for complete search history.

(56) References Cited

U.S. PATENT DOCUMENTS
4,783,700 A * 11/1988 Nagane .......................... 358/482
(Continued)

FOREIGN PATENT DOCUMENTS
EP 2068202 A1 10/2009
(Continued)

OTHER PUBLICATIONS
Communication from Australian Patent Office in corresponding Australian Application No. 2011202326 dated Mar. 29, 2012.
(Continued)

*Primary Examiner* — Que T Le
*Assistant Examiner* — Jennifer Bennett
(74) *Attorney, Agent, or Firm* — Sughrue Mion, PLLC

(57) ABSTRACT

A detection device includes: an imaging unit that forms an image of an incident beam on an image detection unit; an emission unit that includes a guided portion that is guided to a guiding portion provided at the imaging unit and guiding an attachment-detachment operation of the guided portion, a positioned portion that is positioned in a positioning portion provided at the imaging unit, and an emission member that emits a beam toward a direction of a transportation path such that a beam reflected from the medium is incident to the imaging unit; and a setting unit that includes a positioned portion that is positioned in a positioning portion provided at the emission unit when a drawing unit is pressure-inserted into the image forming apparatus and a setting surface that sets a position on the medium at which the beam is reflected.

8 Claims, 19 Drawing Sheets

(51) Int. Cl.
*H04N 1/40* (2006.01)
*G03G 15/00* (2006.01)
*H04N 1/00* (2006.01)
*H04N 1/03* (2006.01)
*H04N 1/12* (2006.01)
*G03G 21/16* (2006.01)
*H04N 1/024* (2006.01)

(52) U.S. Cl.
CPC .. 1/00045 (2013.01); *H04N 1/0005* (2013.01);
*H04N 1/00063* (2013.01); *H04N 1/00087*
(2013.01); *H04N 1/0305* (2013.01); *H04N 1/125* (2013.01); *G03G 21/1623* (2013.01);
*G03G 21/1666* (2013.01); *G03G 2221/1678*
(2013.01); *G03G 2221/1684* (2013.01); *H04N 1/02409* (2013.01); *H04N 1/123* (2013.01);
*H04N 2201/0081* (2013.01); *H04N 2201/0082*
(2013.01); *H04N 2201/02402* (2013.01); *H04N 2201/02404* (2013.01)
USPC .................. 250/239; 250/208.1; 358/471

(56) References Cited

U.S. PATENT DOCUMENTS

| 4,873,579 | A | * | 10/1989 | Kubota et al. ................. 358/471 |
| 5,281,803 | A | * | 1/1994 | Ishizuka ................... 250/208.1 |
| 2007/0091465 | A1 | | 4/2007 | Ichikawa et al. |

FOREIGN PATENT DOCUMENTS

| JP | H06175420 A | 6/1994 |
| JP | 2000115436 A | 4/2000 |
| JP | 2005189341 A | 7/2005 |
| JP | 2010-114498 A | 5/2010 |

OTHER PUBLICATIONS

Japanese Office Action dated May 7, 2014, issued in corresponding Japanese Patent Application No. 2010-238004.

* cited by examiner

DETECTION DEVICE HAVING DETACHABLY ATTACHED PLURAL UNITS AND IMAGE FORMING APPARATUS HAVING THE SAME

CROSS-REFERENCE TO RELATED APPLICATION

This application is based on and claims priority under 35 USC 119 from Japanese Patent Application No. 2010-238004 filed Oct. 22, 2010.

BACKGROUND

Technical Field

The present invention relates to a detection device and an image forming apparatus including the same.

SUMMARY

The present invention provides a detection device that allows an imaging unit, an emission unit, and a setting unit, which are separately embodied as multiple units, to be easily assembled with highly accurate and precise positional relationship.

A first aspect of the invention provides a detection device including an imaging unit that is attachable to and detachable from an image forming apparatus and that forms an image of an incident beam on an image detection unit; an emission unit that is attachable to and detachable from the imaging unit and that includes a guided portion that is guided to a guiding portion provided at the imaging unit and guiding an attachment-detachment operation of the guided portion, a positioned portion that is positioned in a positioning portion provided at the imaging unit when the emission unit is mounted to the imaging unit, and an emission member that emits a beam toward a direction of a transportation path at which a medium is transported such that a beam reflected from the medium is incident to the imaging unit; and a setting unit that is attachable to and detachable from the emission unit, that is accommodated in a drawing unit of the image forming apparatus, and that includes a positioned portion that is positioned in a positioning portion provided at the emission unit when the drawing unit is pressure-inserted into the image forming apparatus and a setting surface that sets a position on the medium at which the beam is reflected.

BRIEF DESCRIPTION OF THE DRAWINGS

Exemplary embodiments of the present invention will be described in detail based on the following figures, wherein.

DETAILED DESCRIPTION

An example of a detection device and an image forming apparatus according to an exemplary embodiment of the invention is described by referring to FIGS. 1 to 19.

(Overall Configuration)

Figure 1:
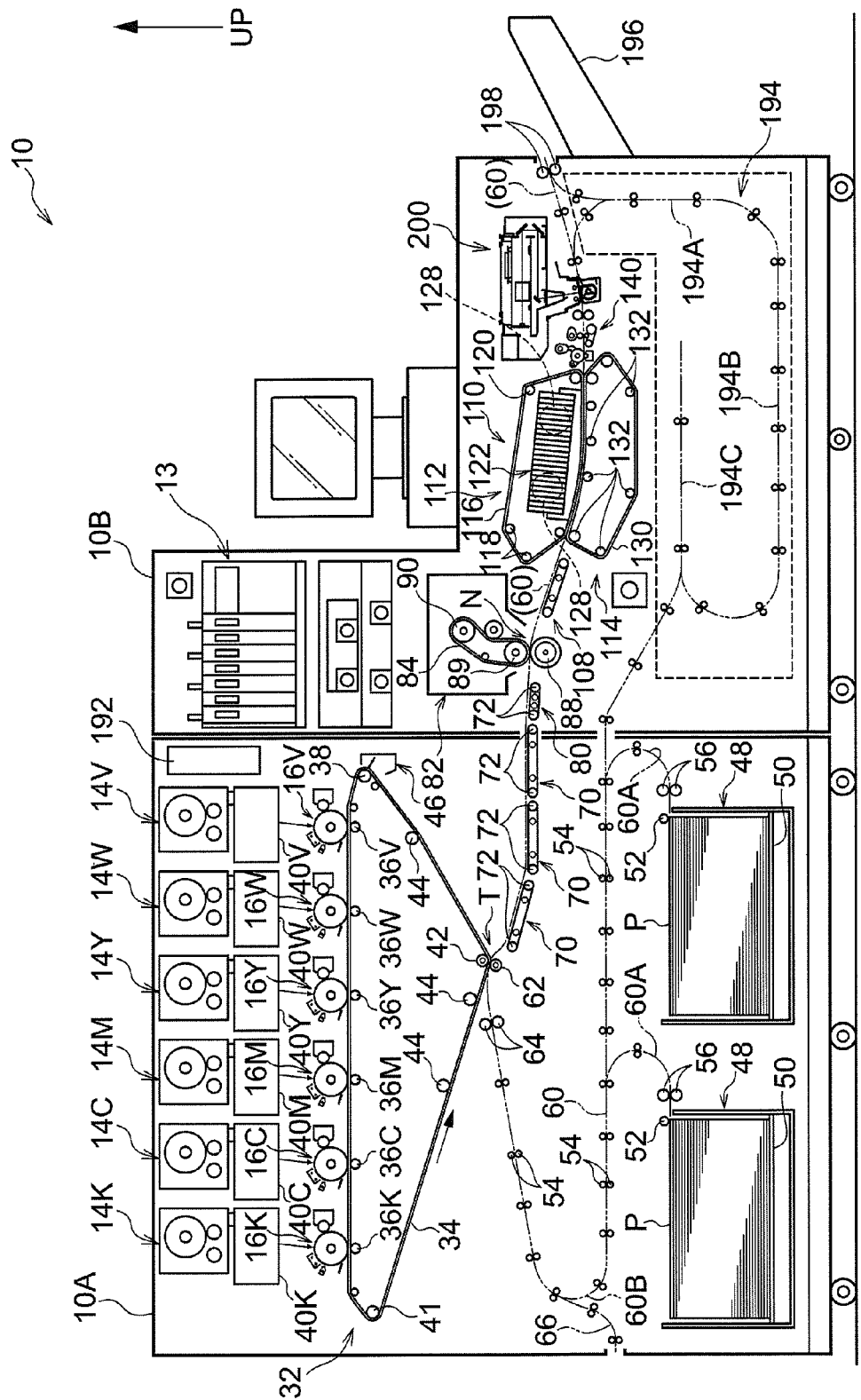
FIG. 1 is a schematic configuration diagram showing an image forming apparatus according to an exemplary embodiment of the invention.

An image forming apparatus 10 according to the exemplary embodiment forms a full color image or a monochrome image, and as shown in FIG. 1, the image forming apparatus includes a first housing 10A which accommodates a first processing unit constituting a negative-side (−) portion of the image forming apparatus in the horizontal direction (the left side portion of FIG. 1), and a second housing 10B which is separably connected to the first housing 10A and accommodates a second processing unit constituting a positive-side (+) portion of the image forming apparatus in the horizontal direction (the right side portion of FIG. 1).

An image signal processing unit 13 that applies the image process is provided at the upper portion of the second housing 10B to process image data transmitted from an external device such as a computer.

On the other hand, the upper portion of the first housing 10A is provided with toner cartridges 14V, 14W, 14Y, 14M, 14C, and 14K which are arranged in the horizontal direction to be replaceable and to accommodate toners of a first specific color (V), a second specific color (W), yellow (Y), magenta (M), cyan (C), and black (K), respectively.

Furthermore, a first specific color and a second specific color are appropriately selected from colors (including transparent colors) other than yellow, magenta, cyan, and black. Further, in the following description, if it is necessary to distinguish the respective components related to the first specific color (V), the second specific color (W), the yellow (Y), the magenta (M), the cyan (C), and the black (K); characters V, W, Y, M, C, and K are added to the reference numerals. On the other hand, if it is not necessary to distinguish the respective components related to the first specific color (V), the second specific color (W), the yellow (Y), the magenta (M), the cyan (C), and the black (K); characters V, W, Y, M, C, and K are omitted.

Further, six image forming units 16 are disposed in the horizontal direction below the toner cartridges 14 to respectively correspond to the toners of the respective colors.

An exposure device 40 provided for each image forming unit 16 is configured to receive the image data subjected to the image process using the image signal processing unit 13 from the image signal processing unit 13, and to emit a beam L modulated in accordance with the image data to an image carrier 18 to be described below (refer to FIG. 2).

Figure 2:
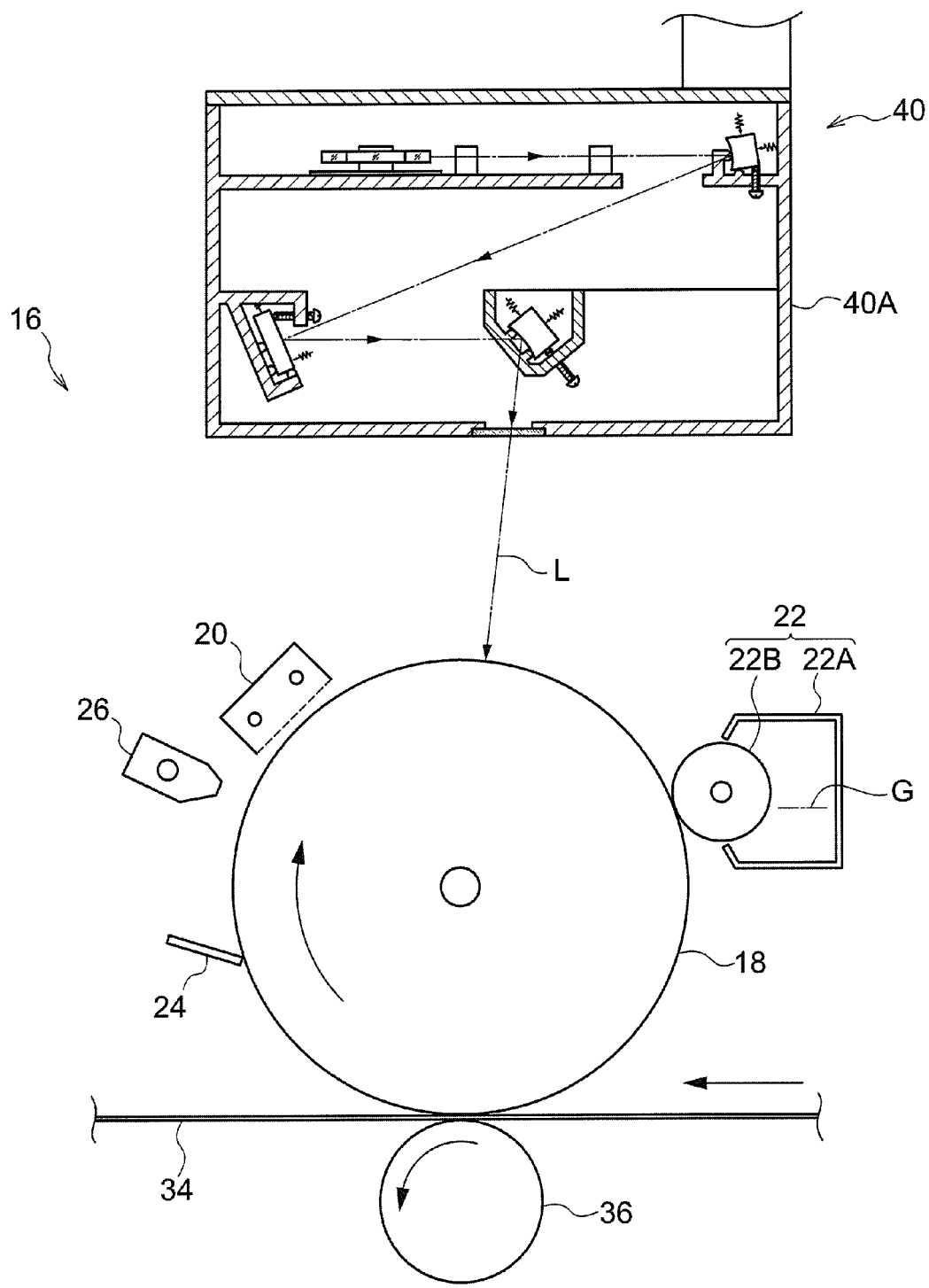
FIG. 2 is a cross-sectional view showing an image forming unit adopted in the image forming apparatus according to the exemplary embodiment of the invention.

As shown in FIG. 2, each image forming unit 16 includes the image carrier 18 which is rotationally driven in one direction (the clockwise direction of FIG. 2). By emitting the beam L from each exposure device 40 to each image carrier 18, an electrostatic latent image is formed on each image carrier 18.

Around each image carrier 18, there are provided a corona discharge type (a non-contact discharge type) scorotron charger 20 which charges the image carrier 18, a developing device 22 which develops the electrostatic latent image formed on the image carrier 18 by the exposure device 40 using a developing agent, a blade 24 which serves as a removing member removing a developing agent remaining on the image carrier 18 after a transfer operation, and a neutralization device 26 which performs a neutralization process by emitting a beam to the image carrier 18 after the transfer operation.

The scorotron charger 20, the developing device 22, the blade 24, and the neutralization device 26 are disposed to face the surface of the image carrier 18, and are sequentially arranged in this order from the upstream side in the rotation direction of the image carrier 18 to the downstream thereof.

The developing device 22 includes a developing agent accommodation member 22A which accommodates a developing agent G containing toner and a developing roll 22B which supplies the developing agent G accommodated in the developing agent accommodation member 22A to the image carrier 18. The developing agent accommodation member 22A is connected to the toner cartridge 14 (refer to FIG. 1) through a toner supply path (not shown), and toner is supplied from the toner cartridge 14 thereto.

As shown in FIG. 1, a transfer unit 32 is provided below each image forming unit 16. The transfer unit 32 includes an annular intermediate transfer belt 34 which contacts each image carrier 18 and a primary transfer roll 36 which serves as a primary transfer member transferring the toner image formed on each image carrier 18 onto the intermediate transfer belt 34 in multiple layers.

The intermediate transfer belt 34 is wound on a driving roll 38 driven by a motor (not shown), a tension applying roll 41 applying a tension to the intermediate transfer belt 34, an opposite roll 42 facing a secondary transfer roll 62 to be described below, and plural winding rolls 44, and is moved by the driving roll 38 to circulate in one direction (the counterclockwise direction of FIG. 1).

Each primary transfer roll 36 is disposed to face the image carrier 18 of each image forming unit 16 with the intermediate transfer belt 34 interposed therebetween. Further, a transfer bias voltage having polarity opposite to the polarity of the toner is applied to the primary transfer roll 36 by a power feeding unit (not shown). With this configuration, the toner image formed on the image carrier 18 is transferred onto the intermediate transfer belt 34.

A removing device 46 is provided at the opposite side of the driving roll 38 with the intermediate transfer belt 34 interposed therebetween to remove toner or paper dust remaining on the intermediate transfer belt 34 by allowing the blade to contact the intermediate transfer belt 34.

Two recording medium accommodation units 48 are provided below the transfer unit 32 to accommodate a recording medium P as an example of a medium such as a sheet.

Each recording medium accommodation unit 48 is configured to be freely drawn out from the first housing 10A. A supply roll 52 is provided above one end (the right side of FIG. 1) of each recording medium accommodation unit 48 to supply the recording medium P from each recording medium accommodation unit 48 to a transportation path 60.

A bottom plate 50 is provided inside each recording medium accommodation unit 48 to load the recording medium P thereon. The bottom plate 50 is configured to be moved downward by a command of a control unit (not shown) when the recording medium accommodation unit 48 is drawn out from the first housing 10A. By moving the bottom plate 50 downward, a space for allowing a user to supplement the recording medium P is formed in the recording medium accommodation unit 48.

When the recording medium accommodation unit 48 drawn out from the first housing 10A is mounted to the first housing 10A, the bottom plate 50 is configured to be moved upward by the command of the control unit. By moving the bottom plate 50 upward, the uppermost recording medium P loaded on the bottom plate 50 contacts the supply roll 52.

A separation roll 56 is provided at the downstream side in the recording medium transportation direction of the supply roll 52 (hereinafter, simply referred to as a "downstream") to separate one by one the recording medium P supplied from the recording medium accommodation unit 48 in an overlapping state. Plural transportation rolls 54 are provided at the downstream of the separation roll 56 to transport the recording medium P to the downstream side in the transportation direction.

The transportation path 60 provided between the recording medium accommodation unit 48 and the transfer unit 32 extends to the transfer position T between the secondary transfer roll 62 and the opposite roll 42 so that the recording medium P supplied from the recording medium accommodation unit 48 is folded back to the left side of FIG. 1 at a first folding back portion 60A and is folded back to the right side of FIG. 1 at a second folding back portion 60B.

A transfer bias voltage having polarity opposite to the polarity of the toner is applied to the secondary transfer roll 62 by a power feeding unit (not shown). With this configuration, the toner images of respective colors transferred onto the intermediate transfer belt 34 in multiple layers are secondly transferred onto the recording medium P transported along the transportation path 60 by the secondary transfer roll 62.

A preliminary path 66 extends from a side surface of the first housing 10A to be merged with the second folding back portion 60B of the transportation path 60. The recording medium P supplied from another recording medium accommodation unit (not shown) disposed adjacent to the first housing 10A is configured to enter the transportation path 60 through the preliminary path 66.

Plural transportation belts 70 are provided at the first housing 10A to be located at the downstream of the transfer position T and to transport the recording medium P having the toner image transferred thereto toward the second housing 10B, and a transportation belt 80 is provided at the second housing 10B to transport the recording medium P transported to the transportation belt 70 to the downstream.

Each of the plural transportation belts 70 and the transportation belt 80 is formed in an annular shape, and is wound on a pair of winding rolls 72. The pair of winding rolls 72 is respectively disposed at the upstream and the downstream side in the transportation direction of the recording medium P, and one winding roll is rotationally driven so that the transportation belt 70 (the transportation belt 80) is circulated in one direction (the clockwise direction of FIG. 1).

A fixing unit 82 is provided at the downstream of the transportation belt 80 to fix the toner image transferred onto the surface of the recording medium P to the recording medium P by heat and pressure.

The fixing unit 82 includes a fixing belt 84 and a pressurizing roll 88 disposed to contact the lower side of the fixing belt 84. A fixing unit N is provided between the fixing belt 84 and the pressurizing roll 88 to fix the toner image by heating and pressurizing the recording medium P.

The fixing belt 84 is formed in an annular shape, and is wound on the driving roll 89 and the driven roll 90. The driving roll 89 faces the upper side of the pressurizing roll 88, and the driven roll 90 is disposed at the upper side of the driving roll 89.

Each of the driving roll 89 and the driven roll 90 includes a heating unit such as a halogen heater. Accordingly, the fixing belt 84 is heated.

As shown in FIG. 1, a transportation belt 108 is provided at the downstream of the fixing unit 82 to transport the recording medium P supplied from the fixing unit 82 to the downstream. The transportation belt 108 has the same configuration as that of the transportation belt 70.

A cooling unit 110 is provided at the downstream of the transportation belt 108 to cool the recording medium P heated by the fixing unit 82.

The cooling unit 110 includes an absorption device 112 which absorbs heat of the recording medium P and a pressing device 114 which presses the recording medium P against the absorption device 112. The absorption device 112 is disposed at one side of the transportation path 60 (the upper side of FIG. 1), and the pressing device 114 is disposed at the other side (the lower side of FIG. 1).

The absorption device 112 includes an annular absorption belt 116 which contacts the recording medium P and absorbs heat of the recording medium P. The absorption belt 116 is wound on a driving roll 120 transmitting a driving force to the absorption belt 116 and plural winding rolls 118.

A heat sink 122 made of aluminum is provided at the inner peripheral side of the absorption belt 116 to come into plane-contact with the absorption belt 116 and to emit heat absorbed to the absorption belt 116.

Furthermore, a fan 128 is disposed at the rear side of the second housing 10B (the inner side of the paper of FIG. 1) to absorb heat from the heat sink 122 and to discharge the heat to the outside thereof.

The pressing device 114 pressing the recording medium P against the absorption device 112 includes an annular press belt 130 which transports the recording medium P while pressing the recording medium P against the absorption belt 116. The press belt 130 is wound on plural winding rolls 132.

A correction device 140 is provided at the downstream of the cooling unit 110 to correct a curl of the recording medium P while transporting the recording medium P in an interposed state.

An inline sensor 200 is provided at the downstream of the correction device 140 as an example of a detection device detecting a toner density defect, an image defect, an image position defect of the toner image fixed to the recording medium P, and a position or a shape of the recording medium P. Furthermore, the inline sensor 200 is described in detail below.

A discharge roll 198 is provided at the downstream of the inline sensor 200 to discharge the recording medium P having an image formed on one surface thereof to a discharge unit 196 mounted to a side surface of the second housing 10B.

On the other hand, when an image is formed on both surfaces of the recording medium P, the recording medium P supplied from the inline sensor 200 is transported to a reversing path 194 provided at the downstream of the inline sensor 200.

The reversing path 194 includes a branch path 194A which is branched from the transportation path 60, a sheet transportation path 194B which transports the recording medium P transported along the branch path 194A toward the first housing 10A, and a reversing path 194C which folds back the recording medium P transported along the sheet transportation path 194B in the reverse direction so that the front and rear surfaces thereof are reversed.

With this configuration, the recording medium P of which the front and rear surfaces are reversed at the reversing path 194C is transported toward the first housing 10A, enters the transportation path 60 provided above the recording medium accommodation unit 48, and is transported to the transfer position T again.

Next, an image forming process of the image forming apparatus 10 is described.

The image data subjected to the image process at the image signal processing unit 13 is transmitted to each exposure device 40. In each exposure device 40, each beam L is emitted therefrom in accordance with the image data to expose each image carrier 18 charged by the scorotron charger 20, so that an electrostatic latent image is formed thereon.

As shown in FIG. 2, the electrostatic latent image formed on the image carrier 18 is developed by the developing device 22, so that the toner images of respective colors of the first specific color (V), the second specific color (W), the yellow (Y), the magenta (M), the cyan (C), and the black (K) are formed.

As shown in FIG. 1, the toner images of respective colors formed on photo conductors 28 of the image forming units 16V, 16W, 16Y, 16M, 16C, and 16K are sequentially transferred to the intermediate transfer belt 34 by using six primary transfer rolls 36V, 36W, 36Y, 36M, 36C, and 36K in multiple layers.

The toner images of respective colors transferred onto the intermediate transfer belt 34 in multiple layers are secondly transferred onto the recording medium P transported from the recording medium accommodation unit 48 by the secondary transfer roll 62. The recording medium P having the toner images transferred thereto is transported to a fixing unit 82 provided inside the second housing 10B by the transportation belt 70.

By heating and pressurizing the toner images of respective colors formed on the recording medium P using the fixing unit 82, the toner images are fixed onto the recording medium P. Furthermore, the recording medium P having the toner images fixed thereto is cooled after passing through the cooling unit 110 and is transported to the correction device 140, so that the curl generated in the recording medium P is corrected.

The recording medium P of which the curl is corrected is detected regarding to an image defect or the like by the inline sensor 200, and then is discharged to the discharge unit 196 by the discharge roll 198.

On the other hand, when an image is formed on a non-imaged surface at which an image has not been formed thereon (when an image is formed on both surfaces), the recording medium P passing through the inline sensor 200 is reversed at the reversing path 194, and is transported to the transportation path 60 provided above the recording medium accommodation unit 48. Then, the toner images are formed on the rear surface in accordance with the above-described procedure.

Furthermore, in the image forming apparatus 10 according to the exemplary embodiment, the components (the image forming units 16V and 16W, the exposure devices 40V and 40W, the toner cartridges 14V and 14W, and the primary transfer rolls 36V and 36W) forming the images of the first specific color and the second specific color may be mounted to the first housing 10A as an additional component in accordance with the selection of the user. Accordingly, the image forming apparatus 10 may not include the components forming the images of the first specific color and the second specific color or any one of the components forming the images of the first specific color and the second specific color.

Next, the inline sensor 200 is described.

In the following description, the length direction of the image forming apparatus 10 (the secondary scanning direction as the transportation direction of the recording medium P) is set as the X direction, the height direction of the apparatus is set as the Y direction, and the depth direction of the apparatus (the primary scanning direction) is set as the Z direction. The X direction, the Y direction, and the Z direction are perpendicular to each other. Further, in the following description, the "front surface" indicates a surface of the apparatus shown in FIG. 1, and the "rear surface" indicates a surface of the apparatus at the opposite side of the front surface.

(Basic Configuration and Function of Inline Sensor)

Figure 3:
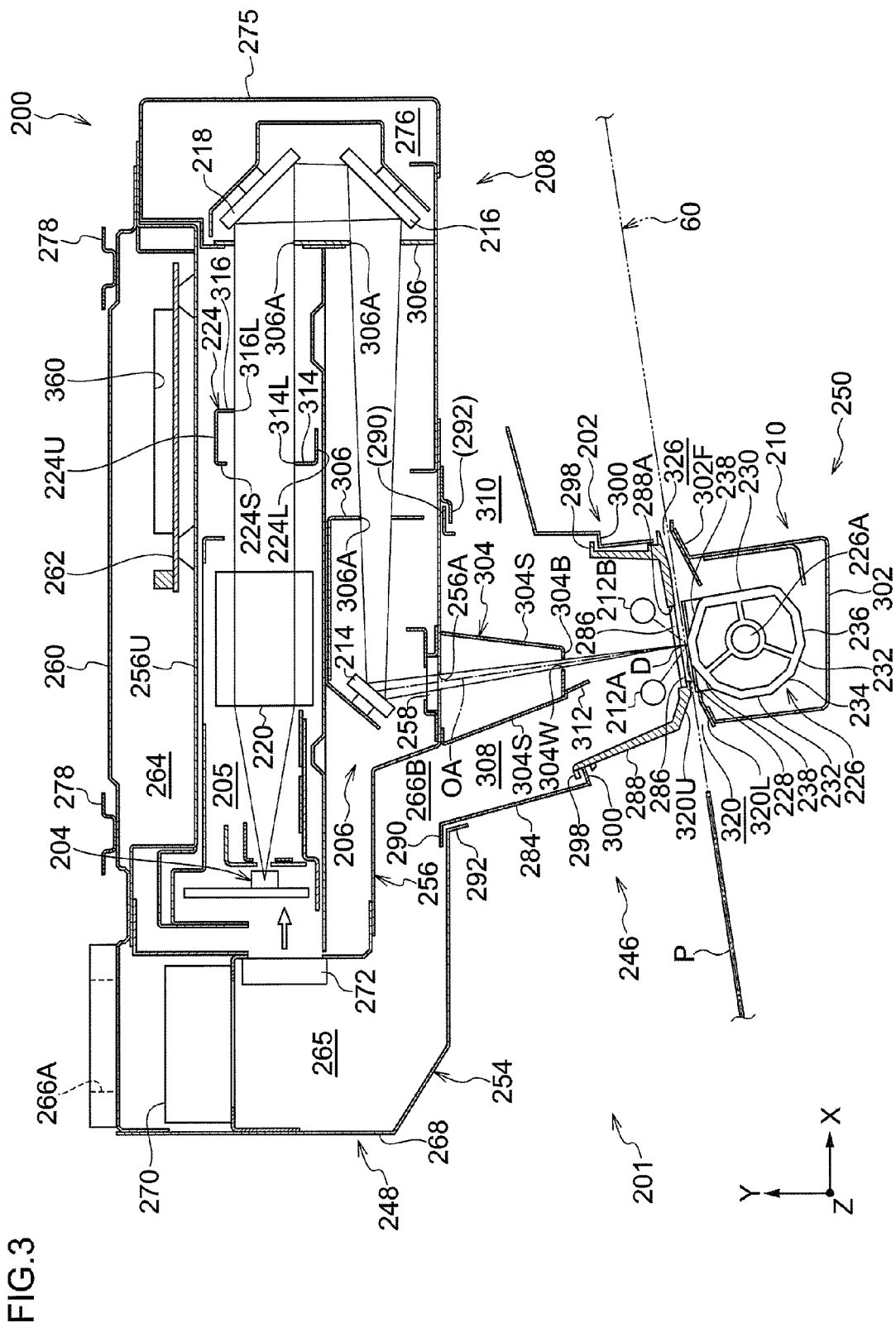
FIG. 3 is a cross-sectional view showing an inline sensor according to the exemplary embodiment of the invention.

As shown in FIG. 3, the inline sensor 200 includes an emission unit 202 which emits a beam toward the recording medium P having an image formed thereon, an imaging unit 208 which has an imaging optical system 206 forming an image in a CCD sensor 204 as an example of an image detection unit by the beam emitted from the emission unit 202 and reflected from the recording medium P, and a setting unit 210 which sets various reference values or the like for the use or the calibration of the inline sensor 200. The CCD sensor 204 receives the beam reflected from the recording medium P and detects the image on the basis of the intensity of the beam.

Furthermore, the beam from the recording medium P includes the reflected beam reflected from the recording medium P and the transmitted beam transmitted through the recording medium P, and in a broad sense, the beam is a beam used to detect information on the image formed on the recording medium P or the position or the shape of the recording medium P. Further, the transmitted beam includes the beam not only exiting the window glass or the like, but also the beam exiting the imaging lens or the like. Furthermore, the detection of the recording medium P includes the detection of the position and the shape of the recording medium P.

The emission unit 202 is disposed above the transportation path 60 of the recording medium P, and includes a pair of lamps 212. Each lamp 212 is a xenon lamp which has a rectangular shape in the Z direction, and the length of the emission range is set to be larger than the width of the maximum recording medium P to be transported. The pair of lamps 212 is symmetrically disposed about the optical axis OA (the optical axis in design) reflected from the recording medium P and directed toward the imaging unit 208. More specifically, the lamps 212 are symmetrically disposed about the optical axis OA so that the emission angle thereof with respect to the recording medium P is from 45° to 50°.

Specifically, the pair of lamps 212 includes a first lamp 212A which is provided at the upstream side in the transportation direction of the recording medium P and a second lamp 212B which is provided at the opposite side of the first lamp 212A with the optical axis OA interposed therebetween.

The imaging optical system 206 mainly includes a first mirror 214 which reflects a beam guided along the optical axis OA in the X direction (in the exemplary embodiment, the downstream side in the transportation direction of the recording medium P), a second mirror 216 which reflects the beam reflected by the first mirror 214 upward, a third mirror 218 which reflects the beam reflected by the second mirror 216 toward the upstream side in the transportation direction of the recording medium P, and a lens 220 which allows the beam reflected by the third mirror 218 to be concentrated on the CCD sensor 204 (so that an image is formed thereon). The CCD sensor 204 is disposed at the upstream side in the transportation direction of the recording medium P with respect to the optical axis OA.

The length of the first mirror 214 in the Z direction is set to be larger than the width of the maximum recording medium P. Then, the first mirror 214, the second mirror 216, and the third mirror 218 reflect the beam that is reflected from the recording medium P and that is incident to the imaging optical system 206 while narrowing it in the Z direction (the secondary scanning direction). Accordingly, the reflected beams from the respective portions of the recording medium P in the width direction are made to be incident onto the substantially cylindrical lens 220.

With the above-described configuration, in the inline sensor 200, the CCD sensor 204 is configured to output (feed back) a signal in accordance with the imaged beam, that is, the image density to a control device 192 of the image forming apparatus 10 (refer to FIG. 1). The control device 192 is configured to correct an image formed in the image forming unit 16 on the basis of the signal from the inline sensor 200. In the image forming apparatus 10, as an example, the intensity of the emission beam, the image formation position, and the like of the exposure device 40 are corrected on the basis of the signal from the inline sensor 200.

Further, a beam quantity diaphragm unit 224 is provided between the third mirror 218 and the lens 220 of the imaging optical system 206. The beam quantity diaphragm unit 224 decreases the quantity of the beam crossing the optical path in the Z direction and imaged at the CCD sensor 204 in the Y direction (the direction intersecting the primary scanning direction), and adjusts the degree of the beam quantity diaphragm through an operation from the outside. The degree of the beam quantity diaphragm using the beam quantity diaphragm unit 224 may be adjusted so that the quantity of the beam imaged at the CCD sensor 204 becomes a predetermined quantity even when the beam emission quantity of each lamp 212 changes with the elapse of time. This is described below in detail.

On the other hand, the setting unit 210 includes a reference roll 226 having a rectangular shape in the Z direction. The reference roll 226 includes a detection reference surface 228 which is directed toward the transportation path 60 when the image detection of the recording medium P is performed, a retreat surface 230 which is directed toward the transportation path when the image detection of the recording medium P is not performed by the inline sensor 200, a white reference surface 232, a color reference surface 234 in which plural color patterns are formed along the length direction, and a complex detection surface 236 in which plural detection patterns are formed. In the exemplary embodiment, the reference roll 226 is formed in a polygonal cylindrical shape having eight or more surfaces in the circumferential direction. Each of the detection reference surface 228, the retreat surface 230, the color reference surface 234, and the complex detection surface 236 has only one surface, and the white reference surface 232 has two surfaces.

The reference roll 226 is configured to switch the surface directed toward the transportation path 60 while rotating about the rotation shaft 226A. The switching of the surface of the reference roll 226 is performed by a control circuit provided at a circuit board 262 to be described below. Further, since the reference roll 226 is formed in a cylindrical shape having a polygonal cross-section with eight corners or more, a difference in distance between the center of each surface in the circumferential direction and the corner portion of the surfaces with respect to the rotation center is suppressed to be small. Accordingly, the corner portion of the surfaces of the reference roll 226 is not interfered with by the emission unit 202 while a distance between each surface of the reference roll 226 and the emission position of each lamp 212 (the window glass 286 to be described below) is suppressed to be small.

The circumferential width of the detection reference surface 228 is set to be smaller than those of the other surfaces, and both circumferential surfaces are formed as guide surfaces 238 not functioning as the reference. The detection reference surface 228 is formed as a setting surface (a position reference surface) setting the position of a detection target (read target) surface (a reflection surface) of the recording medium P to be transported.

The circumferential width of the retreat surface 230 is set to be larger than those of other surfaces. The retreat surface 230 is used as a guide surface guiding the recording medium P when the image detection of the recording medium P is not performed by the inline sensor 200, and the distance from the axis of the rotation shaft 226A to the retreat surface 230 is set to be smaller than that from the detection reference surface 228 to the retreat surface 230. Accordingly, when the image detection of the recording medium P is not performed by the inline sensor 200, the distance from the transportation path to the emission unit 202 (the window glass 286) is wider than that of the case where the image detection of the recording medium P is performed by the inline sensor 200.

The white reference surface 232 is used for the calibration of the imaging optical system 206, and a white film is stuck thereto so that the white reference surface 232 is used as a reference allowing a predetermined signal to output from the imaging optical system 206. The color reference surface 234 is used for the calibration of the imaging optical system 206, and a film having a pattern of a reference color is stuck thereto so that the color reference surface 234 is used as a reference allowing a predetermined signal to output from the imaging optical system 206 in accordance with each color.

Figure 4:
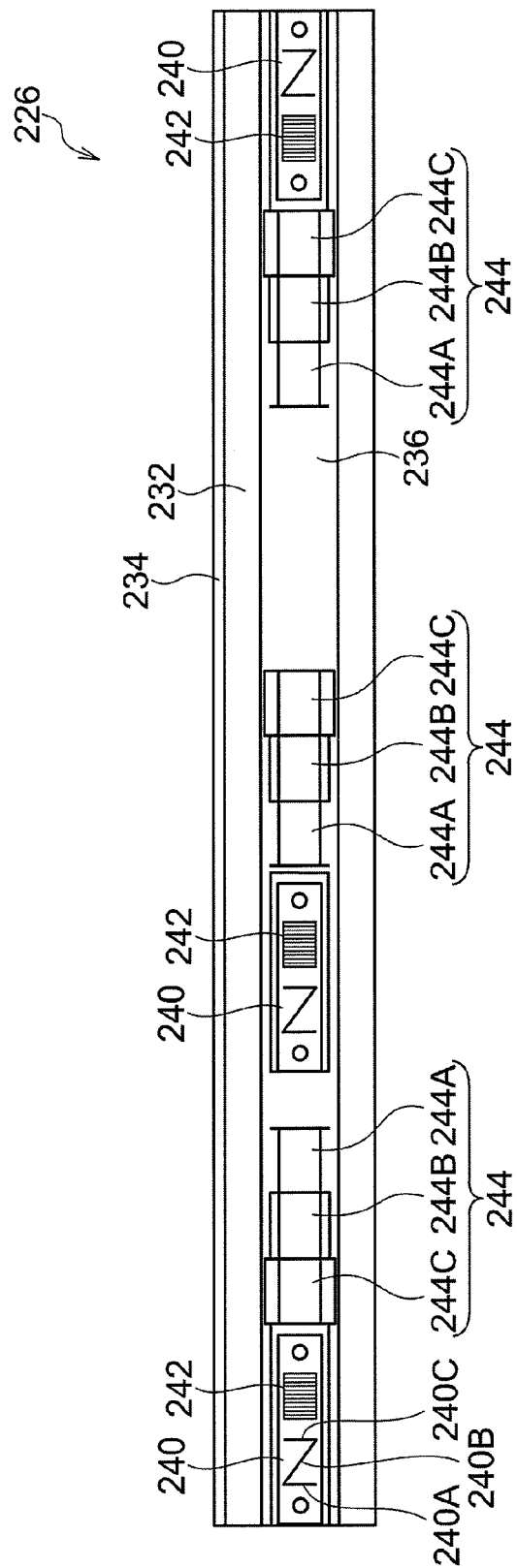
FIG. 4 is a plan view showing a complex detection surface of a reference roll provided at the inline sensor according to the exemplary embodiment of the invention.

As shown in FIG. 4, the complex detection surface 236 has a configuration in which a depth detection pattern 244, a focus detection pattern 242, and a position detection pattern 240 calibrating the position of the reference roll 226 in the rotation direction (in the transportation direction of the recording medium P) are disposed at the same surface.

The position detection pattern 240 is formed in a manner such that a film having a white background is stuck thereto so that the N-shaped vertical line of the black N-shaped pattern is formed on the film along the transportation direction of the recording medium P. The focus detection pattern 242 is formed in a manner such that a film having a white background is stuck thereto so that plural black lines along the width direction of the recording medium P are formed in parallel on the film as a ladder pattern.

The depth detection pattern 244 is formed in a manner such that a film having a white background is stuck thereto so that three depth detection portions 244A, 244B, and 244C having different distances from the rotation shaft 226A of the reference roll 226 have a ladder-shaped step in the length direction of the complex detection surface 236.

At least one position adjustment pattern 240 is provided for each of both ends of the length direction of the complex detection surface 236. Further, the focus detection pattern 242 is disposed to be close to the center of the length direction of the complex detection surface 236 with respect to the position adjustment pattern 240 disposed at both ends. Three depth detection patterns 244 are provided in total to be respectively disposed at both ends of the length direction of the complex detection surface 236 and the center portion thereof. In the exemplary embodiment, one position detection pattern 240 and one focus detection pattern 242 are disposed between the depth detection pattern 244 disposed at the center and the depth detection pattern 244 disposed at both ends in the length direction.

Next, a calibration procedure of the CCD sensor 204 is described.

As shown in FIG. 3, the white reference surface 232 is first directed toward the transportation path 60 of the recording medium P. The CCD sensor 204 outputs a shading correction signal correcting the distribution of the quantity of the beam in the Z direction (the primary scanning direction). Subsequently, the complex detection surface 236 is directed toward the transportation path 60 of the recording medium P, and the detection position using the CCD sensor 204 is automatically adjusted in the transportation direction of the recording medium P in accordance with the position detection pattern 240. That is, as shown in FIG. 4, two linear portions 240A and 240C and an oblique portion 240B therebetween are detected by detecting the N-shaped pattern in the Z direction (the primary scanning direction). Then, the reference roll 226 is rotated so that the distance between the linear portion 240A and the oblique portion 240B becomes equal to the distance between the linear portion 240C and the oblique portion 240B, and the detection position is adjusted.

After the detection position is adjusted in the transportation direction of the recording medium P, the focus of the CCD sensor 204 is checked by the focus detection pattern 242, and the illumination depth degree is checked by the depth detection pattern 244.

Furthermore, the color reference surface 234 is directed toward the transportation path 60 of the recording medium P. The CCD sensor 204 is automatically adjusted so that a signal having a predetermined intensity is output for each color.

Furthermore, as described above, the calibration of the CCD sensor 204 is performed, for example, before the image forming apparatus 10 is turned on (once per day). On the other hand, the calibration of the image forming apparatus 10 (the adjustment or the like of the exposure device 40) based on the signal of the CCD sensor 204 is performed, for example, whenever a predetermined quantity of an image is formed on the recording medium P (ten times per day).

(Separation Structure of Inline Sensor)

Figure 5:
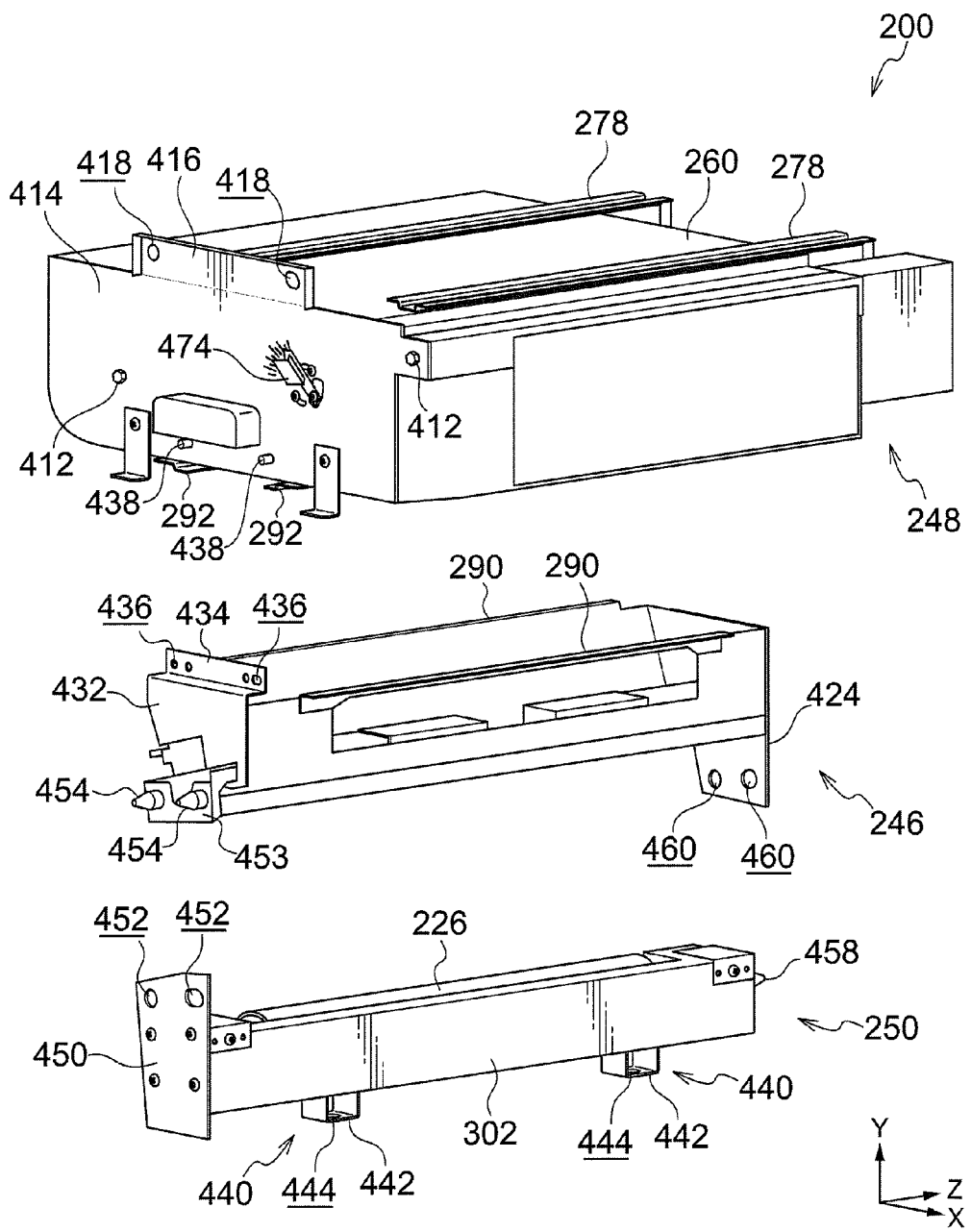
FIG. 5 is an exploded perspective view showing the respective units of the inline sensor according to the exemplary embodiment of the invention.
Figure 6:
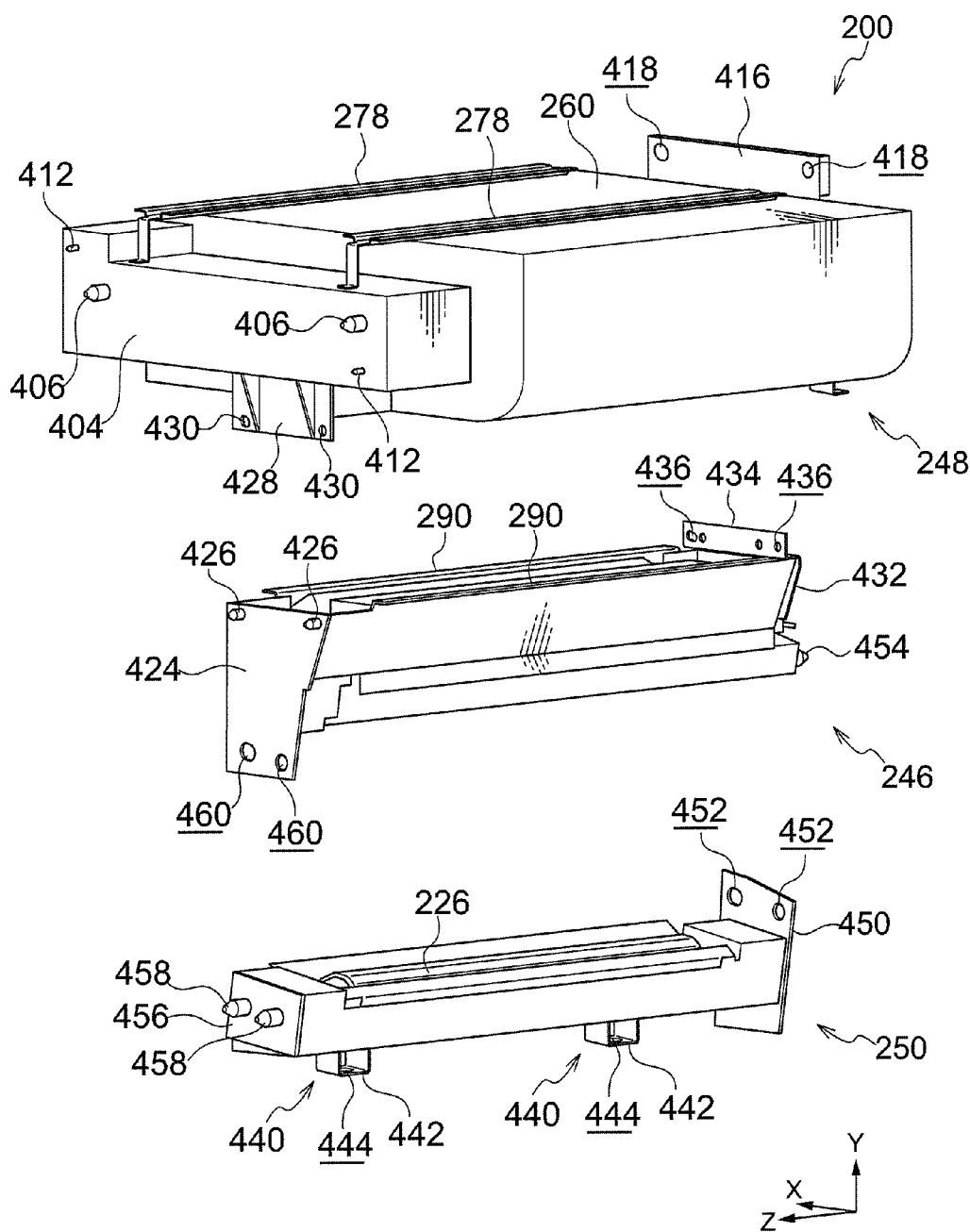
FIG. 6 is an exploded perspective view showing the respective units of the inline sensor according to the exemplary embodiment of the invention.

As shown in FIGS. 3, 5, and 6, the inline sensor 200 may be separated to three units, that is, the center unit 246 mainly including the emission unit 202, the upper unit 248 mainly including the imaging unit 208, and the lower unit 250 mainly including the setting unit 210. In FIG. 5, the front surface of each of the upper unit 248, the center unit 246, and the lower unit 250 is shown. In FIG. 6, the rear surface thereof is shown.

Figure 7:
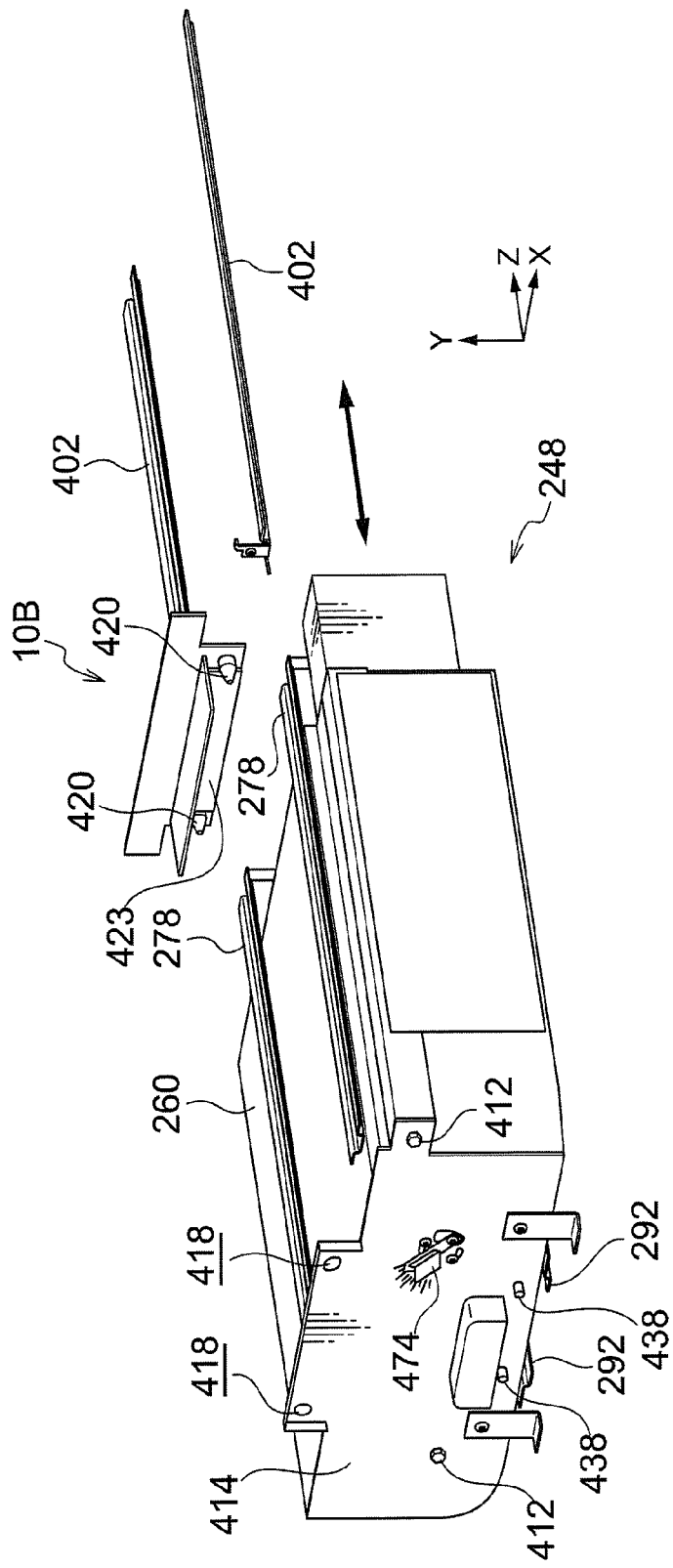
FIG. 7 is a perspective view showing an attachment-detachment state of an upper unit of the inline sensor according to the exemplary embodiment of the invention.
Figure 8:
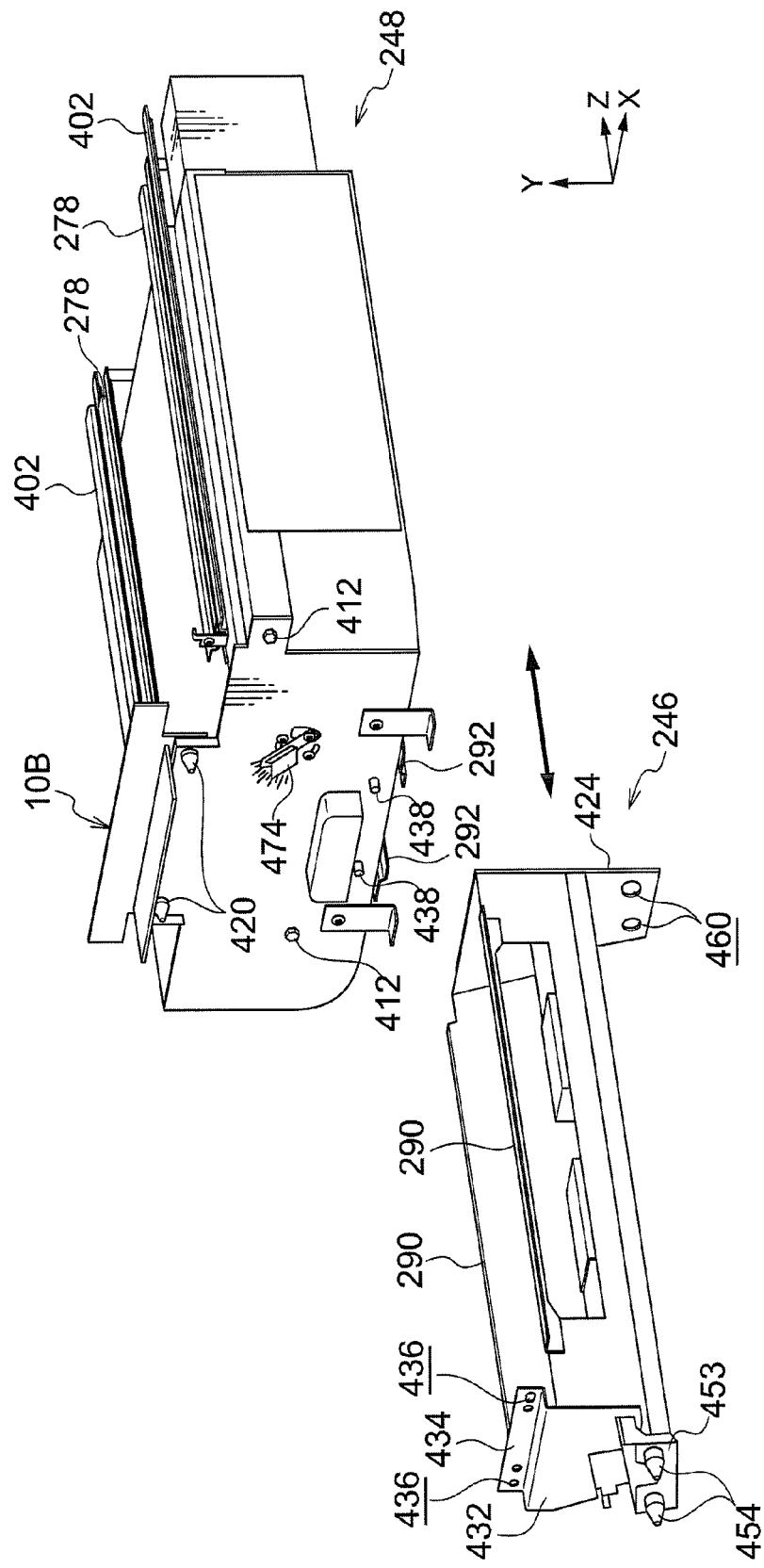
FIG. 8 is a perspective view showing an attachment-detachment state of a center unit of the inline sensor according to the exemplary embodiment of the invention.
Figure 9:
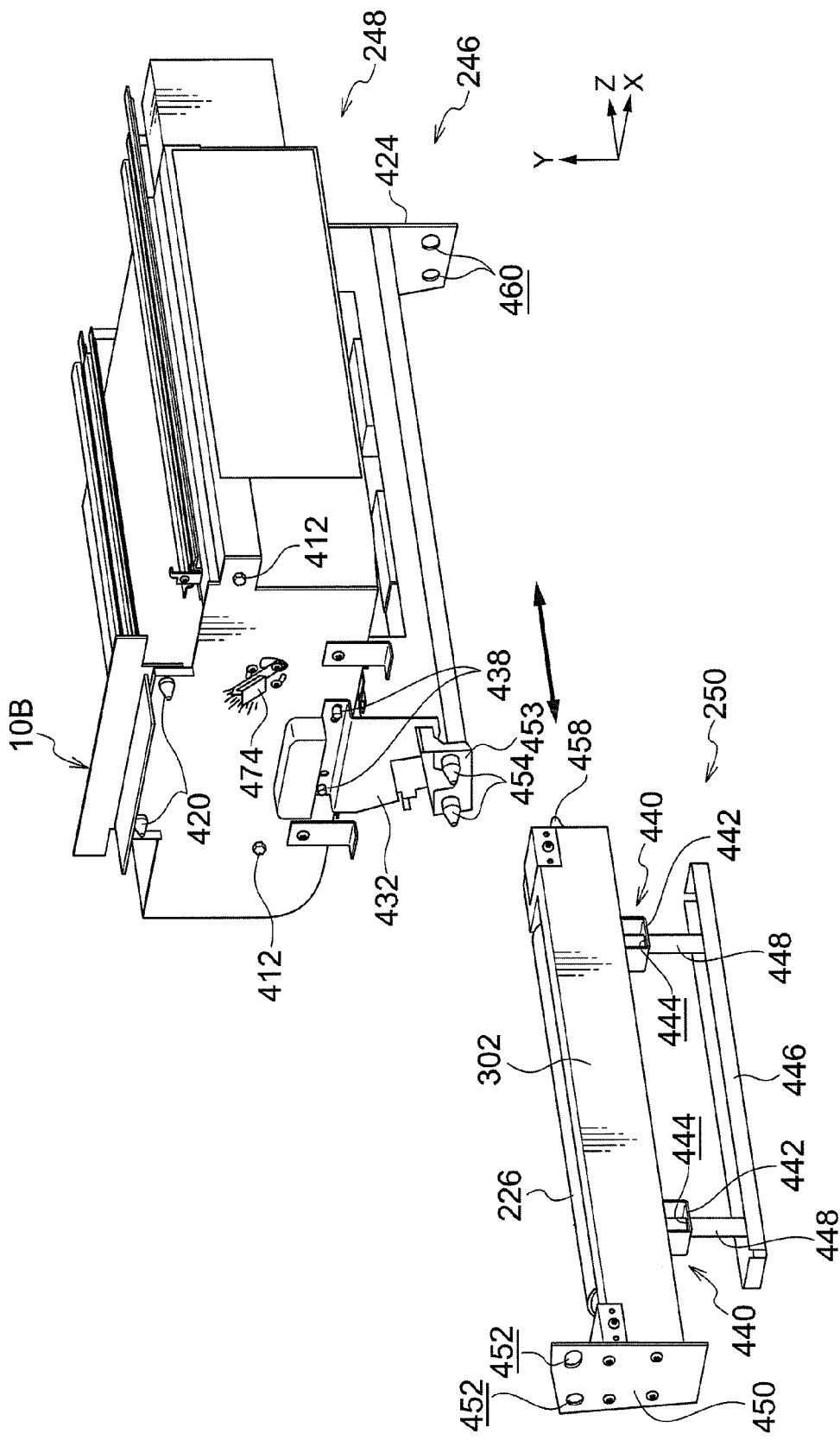
FIG. 9 is a perspective view showing an attachment-detachment state of a lower unit of the inline sensor according to the exemplary embodiment of the invention.
Figure 10:
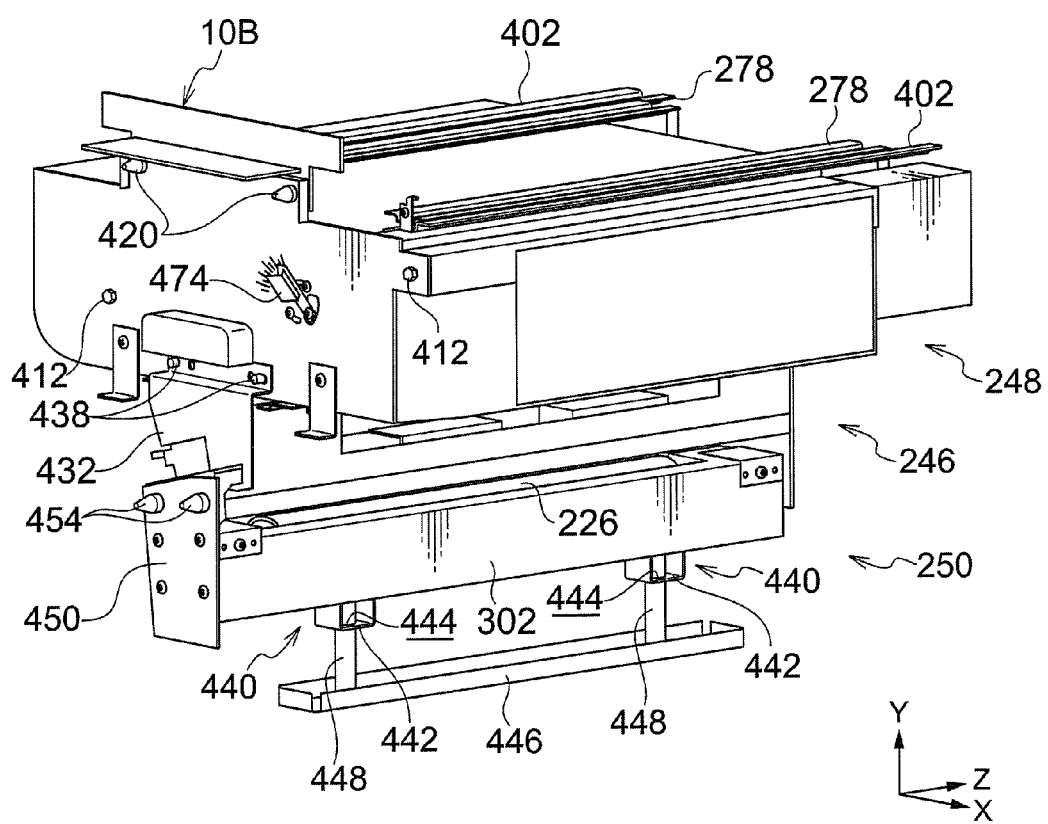
FIG. 10 is a perspective view showing an attachment state of the respective units of the inline sensor according to the exemplary embodiment of the invention.
Figure 11:
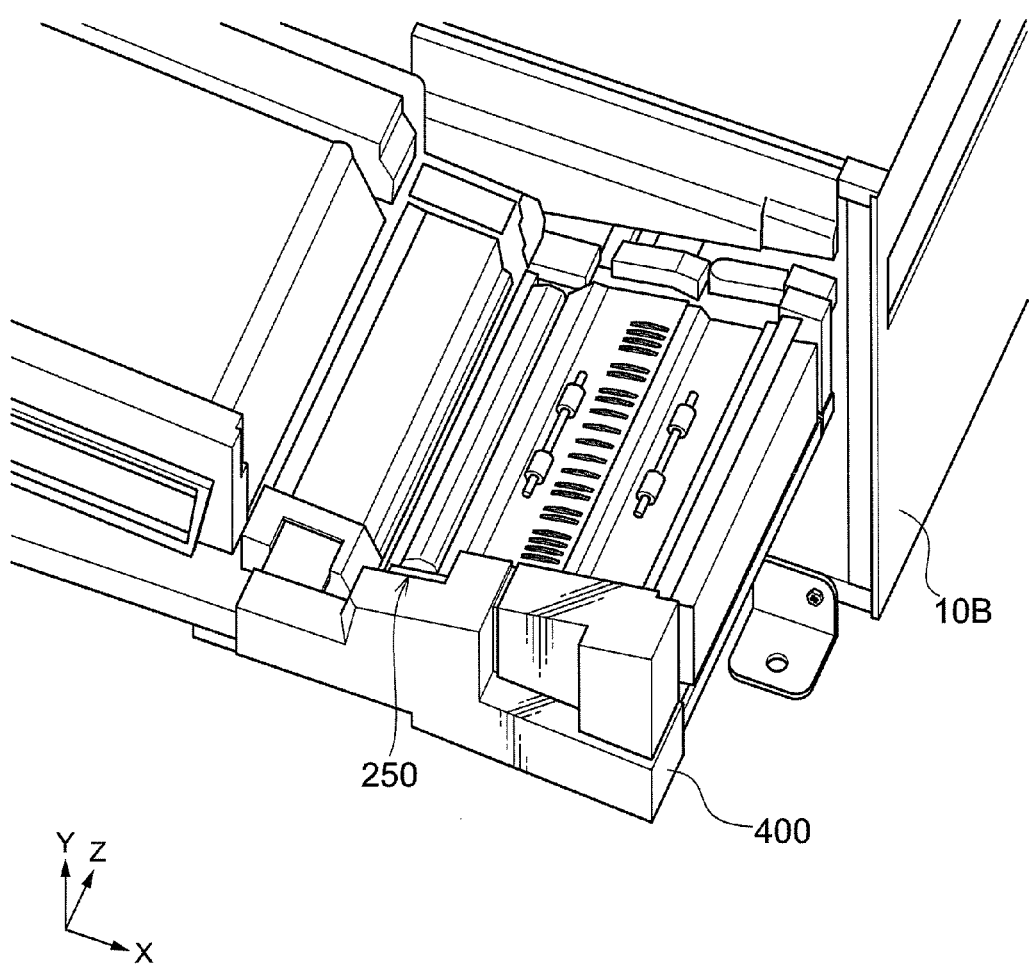
FIG. 11 is a perspective view showing a state where a lower drawer of the image forming apparatus according to the exemplary embodiment of the invention is drawn out.

As shown in FIGS. 7 and 8, the upper unit 248 is slidably attached to and detached from the second housing 10B of the image forming apparatus 10 (refer to FIG. 1) in the Z direction. As shown in FIGS. 8 and 9, the center unit 246 is slidably attached to and detached from the upper unit 248 in the Z direction. As shown in FIGS. 9 and 10, the lower unit 250 is slidably attached to and detached from the center unit 246 in the Z direction. Furthermore, as shown in FIG. 11, the lower unit 250 disposed at the lower side of the transportation path 60 of the recording medium P is supported by a lower drawer 400 as an example of a drawing unit which is drawn from the second housing 10B in order to solve the jamming of the recording medium P, and the lower unit is attachable to and detachable from the center unit 246 with the drawing out or inserting of the lower drawer 400. This is described below in detail.

As shown in FIGS. 3 and 7, an upper cover 260 of the upper unit 248 is provided with a sliders 278 which are an example of a portion to be guided having a rectangular shape in the Z direction. In the exemplary embodiment, a pair of sliders 278 is provided at the upper cover 260 to be in parallel as depicted by the arrow in the X direction. Each slider 278 is fitted to a rail 402 which is an example of a guiding portion provided at the second housing 10B, and moves while being guided on the rail 402, so that the upper unit 248 moves in the Z direction with respect to the second housing 10B.

Figure 12:
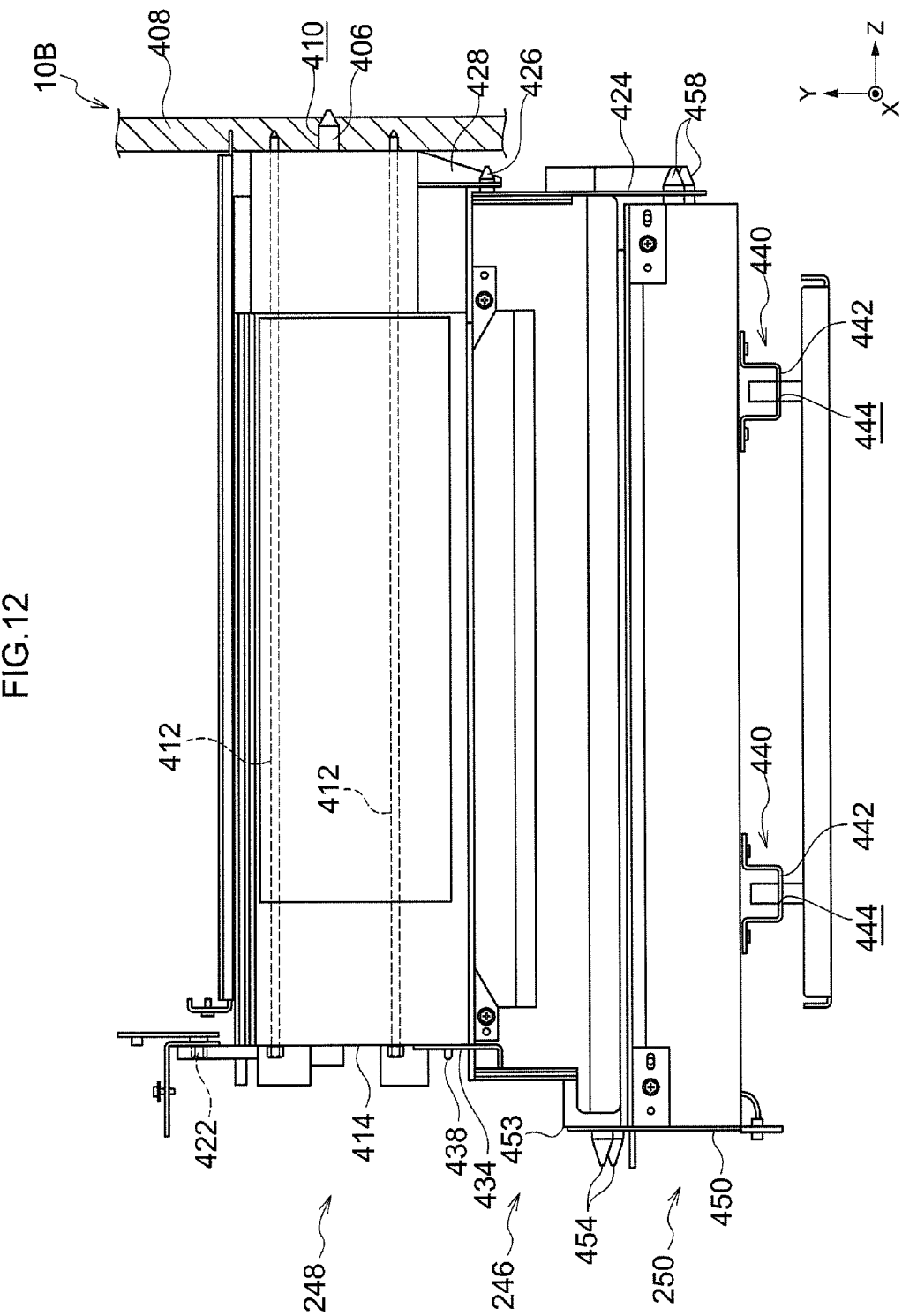
FIG. 12 is a side view showing an attachment state of the respective units of the inline sensor according to the exemplary embodiment of the invention.

As shown in FIG. 6, a rear cover 404 of the upper unit 248 is provided with two positioning pins 406 as an example of a portion to be positioned protruding outward. On the other hand, a receiving frame 408 (shown in FIG. 12) as an example of a positioning portion of the second housing 10B is provided with two positioning holes 410 (only one of them is shown in FIG. 12) respectively corresponding to the positioning pins 406. One of two positioning holes 410 is formed as an elongated hole in the X direction. Then, when the upper unit 248 is mounted to the second housing 10B, the positioning pins 406 is inserted into the positioning holes 410, and the rear surface of the upper unit 248 is positioned in the X and Y directions with respect to the second housing 10B. Further, when the rear cover 404 is pressed against the receiving frame 408, the upper unit is positioned in the Z direction.

In order to fix the upper unit 248 to the second housing 10B so that the rear cover 404 is pressed against the receiving frame 408, the upper unit 248 and the receiving frame 408 are fastened to each other by using an elongated screw 412 inserted through from the front surface of the upper unit 248 toward the rear surface thereof. By using the elongated screw 412, the upper unit and the receiving frame may be screw-fastened to each other from the front surface of the upper unit with high workability.

As shown in FIG. 5, a front cover 414 of the upper unit 248 is provided with a protrusion portion 416 which is an example of a portion to be positioned protruding upward in the Y direction, and the protrusion portion 416 is provided with two positioning holes 418. One of the two positioning holes 418 is formed as an elongated hole in the X direction. On the other hand, the second housing 10B is provided with a positioning pin 420 (shown in FIG. 7) which is an example of a positioning portion corresponding to the positioning hole 418. Then, when the upper unit 248 is mounted to the second housing 10B, the positioning pin 420 is fitted to the positioning hole 418, and the front surface of the upper unit 248 is positioned in the X and Y directions with respect to the second housing 10B. Furthermore, after the attachment, the protrusion portion 416 and the second housing 10B are fastened to each other at the front surface of the upper unit by a screw 422 (shown in FIG. 12). Here, a position of a frame 423 (shown in FIG. 7) fastened to the protrusion portion 416 by the screw 422 is adjustable in the Z direction (not shown). After the upper unit 248 is positioned in the Z direction at the rear surface, the frame 423 and the protrusion portion 416 are fastened to each other by the screw 422 while adjusting the position of the frame 423 at the front surface in the Z direction.

As shown in FIGS. 3 and 8, the center unit 246 includes a pair of sliders 290 which is an example of a pair of portions to be guided having a rectangular shape in the Z direction and protruding in a flange shape in the X direction from the upper edge of the center unit 246. Each slider 290 is fitted to a rail 292 which is an example of a guiding portion formed at the lower surface of the upper unit 248, and moves while being guided on the rail 292, so that the center unit 246 moves in the Z direction with respect to the upper unit 248.

As shown in FIG. 6, an upper end of a rear cover 424 of the center unit 246 is provided with two positioning pins 426 as an example of a portion to be positioned protruding outward. On the other hand, the rear cover 404 of the upper unit 248 is provided with a protrusion plate 428 as an example of a positioning portion protruding downward in the Y direction, and the protrusion plate 428 is provided with two positioning holes 430 respectively corresponding to the positioning pins 426. One of the two positioning holes 430 is formed as an elongated hole in the X direction. Then, when the center unit 246 is mounted to the upper unit 248, the positioning pin 426 is inserted into the positioning hole 430, and the center unit 246 is positioned in the X and Y directions with respect to the upper unit 248 at the rear surface.

As shown in FIG. 5, a front cover 432 of the center unit 246 is provided with a protrusion portion 434 as an example of a portion to be positioned protruding upward in the Y direction, and the protrusion portion 434 is provided with two positioning holes 436. One of the two positioning holes 436 is formed as an elongated hole in the X direction. On the other hand, the lower end of the front cover 414 of the upper unit 248 is provided with two positioning pins 438 as an example of a positioning portion corresponding to the positioning holes 436. Then, when the center unit 246 is mounted to the upper unit 248, the positioning hole 436 is fitted to the positioning pin 438, and the center unit 246 is positioned in the X and Y directions with respect to the upper unit 248 at the front surface. Further, when the protrusion portion 434 is pressed against the front cover 414, the protrusion portion 434 is positioned in the Z direction. Furthermore, when the protrusion portion 434 and the front cover 414 are fastened to each other by a screw, the protrusion portion 434 is pressed against the front cover 414.

As shown in FIGS. 3, 5, 9, and the like, the lower unit 250 includes the reference roll 226 and a lower housing 302 accommodating a motor (not shown) driving the reference roll 226. The lower surface of the lower housing 302 is provided with two leg portions 440 each having a C-shape when seen in the X direction. A lower plate 442 of each leg portion 440 is provided with a positioning hole 444, and when the positioning holes 444 are fitted to two positioning pins 448 protruding in the Y direction from a lower surface member 446 of the lower drawer 400, the front end of the positioning pin 448 comes into contact with the lower surface of the lower housing 302, so that the lower unit 250 is supported by the lower drawer 400. Each of the two positioning holes 444 is formed as an elongated hole in the X direction, and when the positioning hole 444 is fitted to the positioning pin 448, the lower unit 250 is positioned only in the Z direction with respect to the lower drawer 400.

As shown in FIG. 5, a front cover 450 as an example of a portion to be positioned of the lower unit 250 protrudes upward and downward in the Y direction, and the upper side of the front cover 450 is provided with two positioning holes 452. One of the two positioning holes 452 is formed as an elongated hole in the X direction. On the other hand, a protrusion surface 453 protruding in the Z direction from the lower end of the front cover 432 of the center unit 246 is provided with positioning pins 454 as an example of a positioning portion corresponding to the positioning holes 452.

As shown in FIG. 6, a rear cover 456 of the lower unit 250 is provided with two positioning pins 458 as an example of a portion to be positioned protruding outward. On the other hand, the rear cover 424 as an example of a positioning portion of the center unit 246 protrudes downward in the Y direction, and two positioning holes 460 are provided at the protrusion position to respectively correspond to the positioning pins 458. One of the two positioning holes 460 is formed as an elongated hole in the X direction.

Then, as shown in FIGS. 9 and 10, when the lower drawer 400 is press-inserted into the second housing 10B and the lower unit 250 is mounted to the center unit 246, the positioning holes 452 of the lower unit 250 are fitted to the positioning pins 454 of the center unit 246 at the front surface, and the positioning pins 458 of the lower unit 250 are fitted to the positioning holes 460 of the center unit 246 at the rear surface. Accordingly, the lower unit 250 is positioned in the X and Y directions with respect to the center unit 246 at the front surface and the rear surface. The position of the lower unit 250 with respect to the center unit 246 in the Z direction is defined at a position where the lower drawer is press-inserted into the second housing 10B. Furthermore, since the lower unit 250 is positioned in the Y direction by the positioning pins 454 and 458 and the positioning holes 452 and 460, as shown in FIG. 12, the lower unit is floated from the positioning pin 448, that is, the lower unit is suspended on the center unit 246.

Further, as shown in FIGS. 5 and 12, the joining surface for positioning between the upper unit 248 and the center unit 246 (the joining surface between the front cover 414 and the protrusion portion 434) is disposed closer to the drawing end of the lower drawer 400 than the joining surface for positioning between the center unit 246 and the lower unit 250 (the joining surface between the protrusion surface 453 and the front cover 450).

As described above, since the inline sensor 200 is formed as a structure in which the inline sensor may be separated to the center unit 246, the upper unit 248, and the lower unit 250, each unit may be repaired and replaced when the unit is broken. Further, particularly, when the center unit 246 and the lower unit 250 are separated, the jamming of the recording medium P may be solved easily.

(Configuration of Upper Unit)

As shown in FIG. 3, the upper unit 248 includes an upper housing 254. The upper housing 254 accommodates the imaging unit 208 and the circuit board 262 to be described below, and constitutes a cooling duct 265 and the like. The upper housing 254 includes an imaging system housing 256 accommodating the CCD sensor 204 and the imaging optical system 206.

The imaging system housing 256 has a substantially rectangular box shape in the X direction when seen from the Z direction, and one end in the X direction (in the exemplary embodiment, the upstream end in the transportation direction of the recording medium P) accommodates the CCD sensor 204. Further, the other end of the imaging system housing 256 in the X direction is provided with the second mirror 216 and the third mirror 218. Then, the substantially center portion of the imaging system housing 256 in the X direction is provided with a window portion 256A to which a beam is incident along the optical axis OA. In the imaging system housing 256, the window portion 256A is blocked by a window glass 258 through which a beam can be transmitted, whereby the interior thereof is formed as an air-tightly sealed space and an optical chamber 205 accommodating the CCD sensor 204 and the like is provided.

The upper housing 254 includes the upper cover 260 which covers the upper side of the imaging system housing 256. Accordingly, a substrate chamber 264 is provided between an upper wall 256U of the imaging system housing 256 and the upper cover 260 to accommodate the circuit board 262. Further, the upper housing 254 includes a duct cover 268 forming the duct 265 at the outside of one end in the X direction as the side where the CCD sensor 204 is disposed in the imaging system housing 256. The duct cover 268 covers the end of the imaging system housing 256 at the upstream side in the transportation direction of the recording medium P and at the side of the sheet transportation path 60, and forms the duct 265 having an L-shape in X-Y cross-section.

The upper end of the duct 265 is formed as an air introduction port 266A, and the end of the duct 265 opposite to the air introduction port 266A is formed as a connection port 266B connected to a duct 308 of a lamp housing 284 to be described below. A fan 270 is disposed in the duct 265 to generate an air stream moving from the upper side of the interior of the duct 265 to the lower side thereof. Further, a fan 272 is disposed in the duct 265 to supply air into the optical chamber 205 provided at the imaging system housing 256 (to allow the optical chamber 205 to have a constant pressure). Furthermore, a fan (not shown) is provided at the duct 265 to supply air into the substrate chamber 264.

Furthermore, the upper housing 254 includes a cover 275 which covers the imaging system housing 256 at the side of the second mirror 216 and the third mirror 218. The cover 275 forms an insulation space 276 between the cover 275 and the imaging system housing 256.

(Configuration of Center Unit)

As shown in FIG. 3, the center unit 246 includes the lamp housing 284 accommodating the pair of lamps 212 and a window cover 288 holding a window glass 286 through which the beams of the lamp 212 are transmitted toward the recording medium P. Specifically, the lamp housing 284 is formed in a box shape opened upward and downward, the upper open end is blocked by the upper housing 254, and the lower open end is blocked by the window cover 288.

Then, in the emission unit 202, a beam emitted from each lamp 212 is emitted to the recording medium P through the window glass 286, and the beam reflected from the recording medium P is incident to the lamp housing 284 along the optical axis OA through the window glass 286. The beam that is reflected from the recording medium P and is incident to the lamp housing 284 is guided into the imaging unit 208 through the window glass 258 of the imaging system housing 256 constituting the imaging unit 208.

Figure 13A:
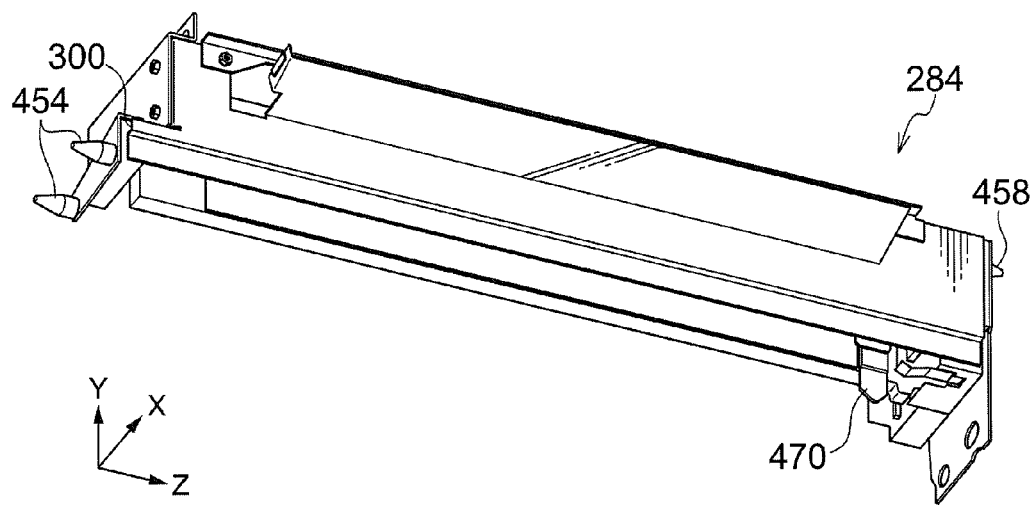
FIG. 13A is a perspective view showing a lamp housing and a window cover of the inline sensor according to the exemplary embodiment of the invention.
Figure 13B:
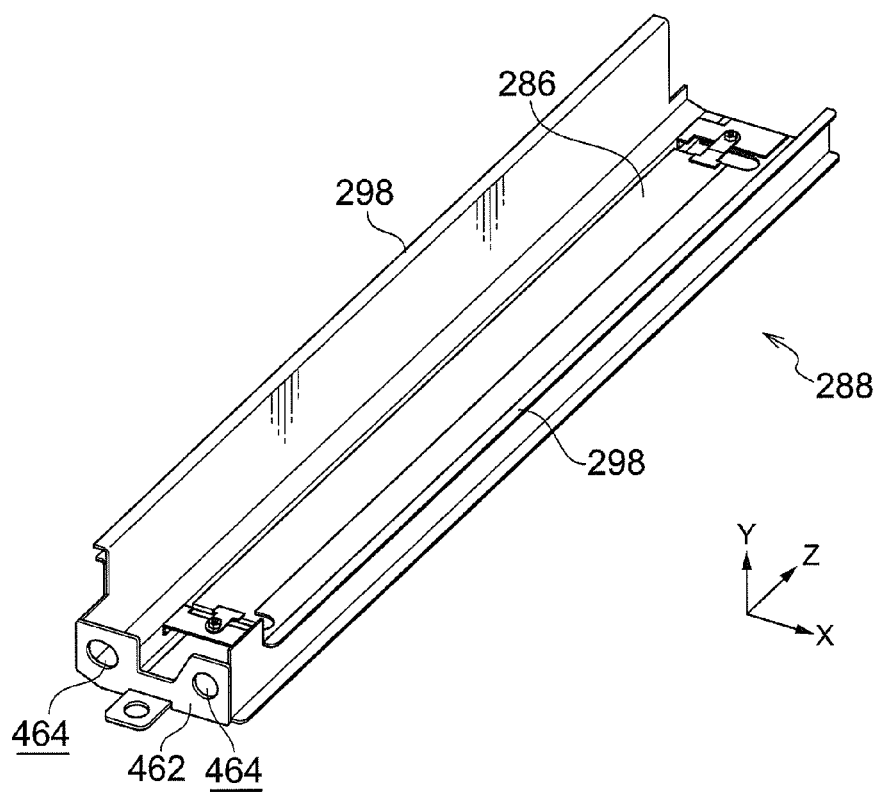
FIG. 13B is a perspective view showing a lamp housing and a window cover of the inline sensor according to the exemplary embodiment of the invention.
Figure 14:
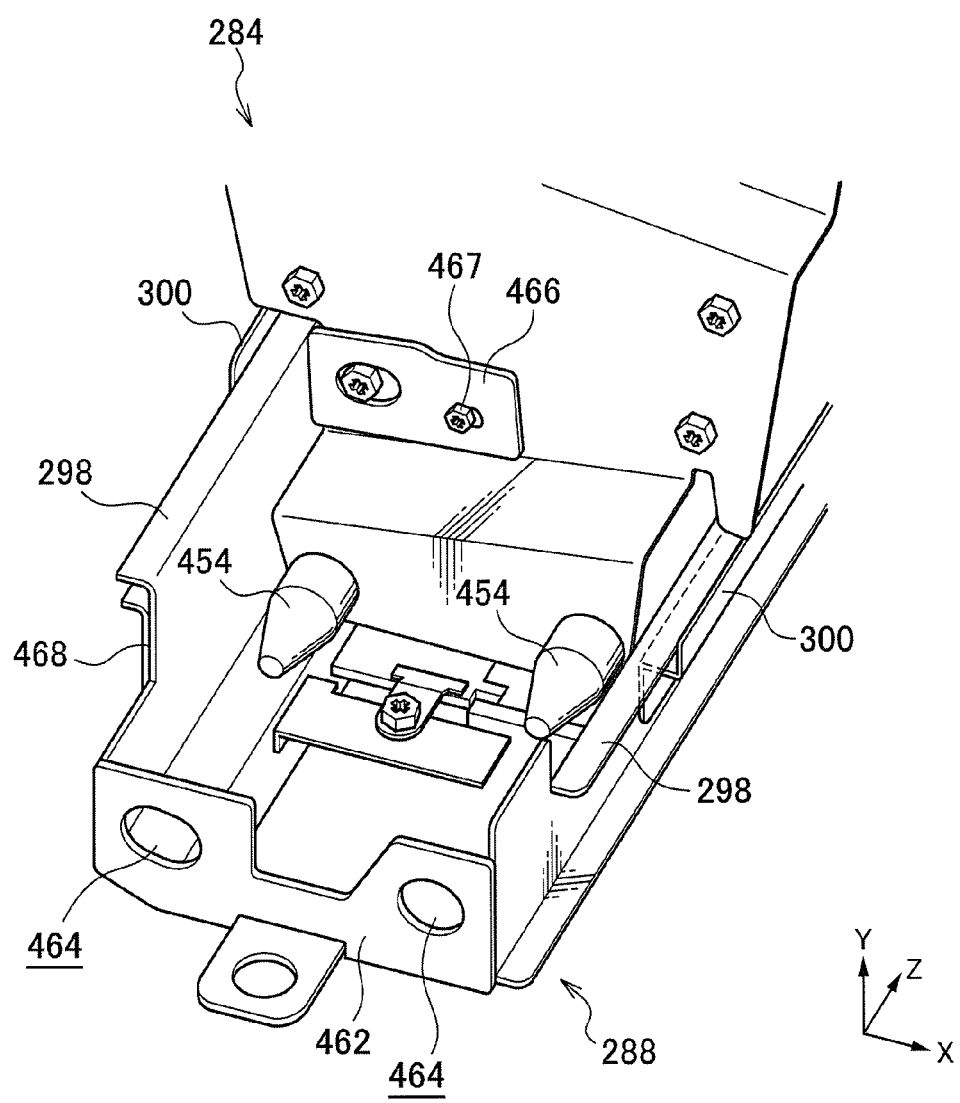
FIG. 14 is a perspective view showing a state where the lamp housing and the window cover of the inline sensor according to the exemplary embodiment of the invention are being attached.

As shown in FIGS. 13A and 13B, the window cover 288 is attachable to and detachable from the lamp housing 284. Specifically, the X-Y cross-sectional shape of the window cover 288 is formed in a C-shape so that the upper side is open, and the edge of the open portion is provided with a pair of sliders 298. Each slider 298 is fitted to a rail 300 formed in the lamp housing 284. Accordingly, as shown in FIG. 14, each slider 298 moves while being guided along the rail 300, and the window cover 288 is configured to be attachable to and detachable from the lamp housing 284 in the Z direction. Accordingly, in the inline sensor 200, the window cover 288 may be replaced or cleaned as a single component.

Furthermore, as shown in FIG. 3, the edge of the window cover 288 and the edge of the window glass 286 are formed not to be directed toward the upstream side in the transportation direction of the recording medium P. Both longitudinal direction ends of the window glass 286 are pressed by the window cover 288 through an attachment spring (not shown) in a posture of blocking a window portion 288A formed in the window cover 288. That is, the window glass 286 is attachable to and detachable from the window cover 288. Accordingly, in the inline sensor 200, the window glass 286 may be replaced or cleaned as a single component.

(Arrangement of Lower Unit and Window Cover)

As shown in FIGS. 13A and 13B, a front plate 462 at a front side of the window cover 288 is provided with two positioning holes 464. One of the two positioning holes 464 is formed as an elongated hole in the X direction. Then, as shown in FIG. 14, when the window cover 288 is mounted to the lamp housing 284, the positioning holes 464 are fitted to the positioning pins 454, and the window cover 288 at the front surface is positioned in the X and Y directions with respect to the lamp housing 284. Furthermore, after the attachment, the cover stop plate 466 (shown in FIG. 14) provided at the lamp housing 284 is made to slide up to a position caught by a notch portion 468 of the side plate of the window cover 288, thereby preventing the window cover 288 from being separated from the lamp housing 284. Specifically, after the window cover 288 is mounted to the lamp housing 284, a screw 467 is first loosened, then the cover stop plate 466 is made to slide up to a position caught by the notch portion 468, and the screw 467 is fastened again to fix the cover stop plate 466, thereby preventing the window cover 288 from being separated from the lamp housing 284.

On the other hand, as described above, when the lower unit 250 is mounted to the center unit 246, the positioning holes 452 of the front cover 450 of the lower unit 250 are also fitted to the positioning pins 454. That is, since the window cover 288 and the lower unit 250 are positioned by the common positioning pins 454 at the front surface, the window cover 288 is disposed to have high positioning precision with respect to the lower unit 250.

Figure 15:
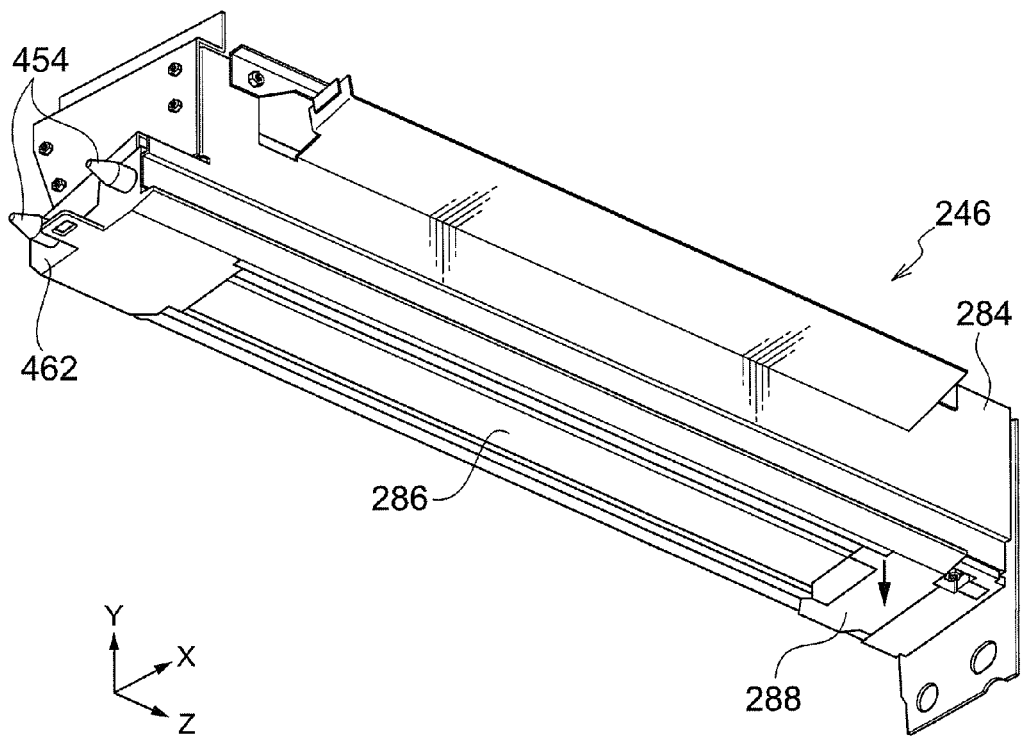
FIG. 15 is a perspective view showing a state where the lamp housing and the window cover of the inline sensor according to the exemplary embodiment of the invention are attached.

As shown in FIGS. 13A and 13B, a biasing block 470 is provided inside the lamp housing 284. One biasing block 470 is provided at the rear surface in the Z direction near the center in the X direction. The biasing block 470 generates a biasing force downward in the Y direction by a compressing spring (not shown) provided therein. As shown in FIG. 15, the biasing block 470 biases the window cover 288 from the interior thereof downward in the Y direction while the window cover 288 is mounted to the lamp housing 284.

Figure 16:
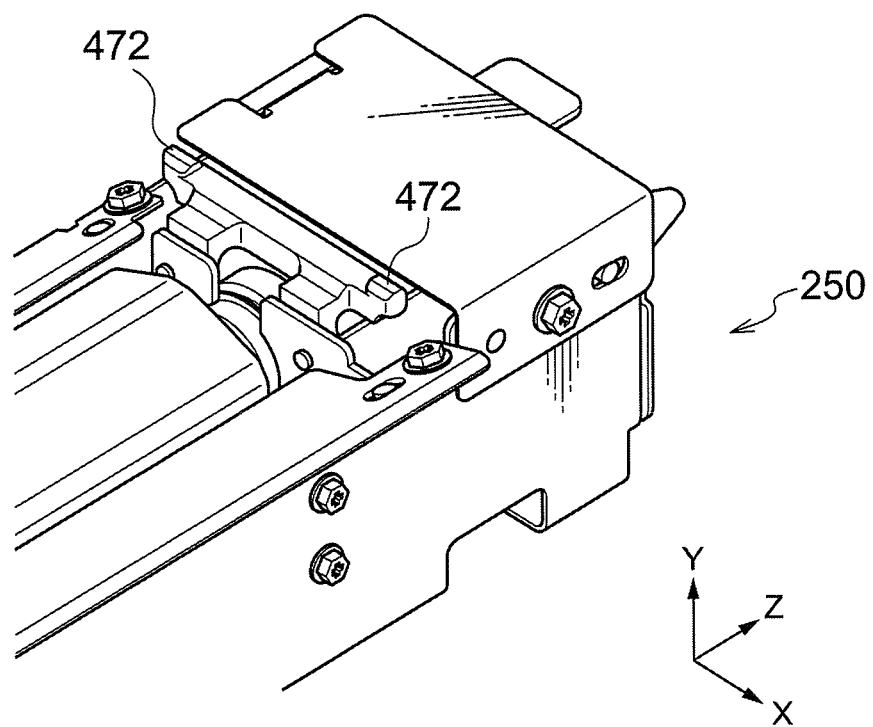
FIG. 16 is a perspective view showing an upper surface portion of a lower housing of the inline sensor according to the exemplary embodiment of the invention.

On the other hand, as shown in FIG. 16, the upper surface of the rear surface of the lower unit 250 is provided with two defining portions 472 arranged in the X direction. Each defining portion 472 protrudes from the reading surface of the recording medium P in the perpendicular direction by a predetermined distance such as, for example, 2 mm, and is used as datum defining the position of the window cover 288 disposed at the upper portion of the lower unit 250. Then, when the lower unit 250 is mounted to the center unit 246, the window cover 288 is pressed against the defining portion 472 by the biasing block 470.

Accordingly, since the window cover 288 is biased and pressed toward the defining portion 472 as datum provided at the lower unit 250 at the rear surface, the window cover 288 is disposed to have high positioning precision with respect to the lower unit 250 in the Y direction.

Figure 17A:
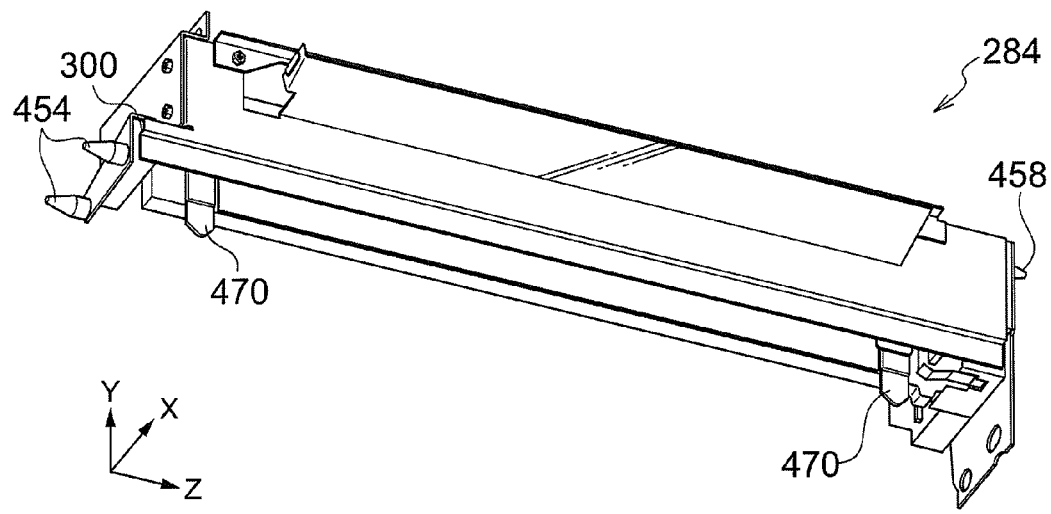
FIG. 17A is a perspective view showing modified examples of the lamp housing and the window cover of the inline sensor according to the exemplary embodiment of the invention.
Figure 17B:
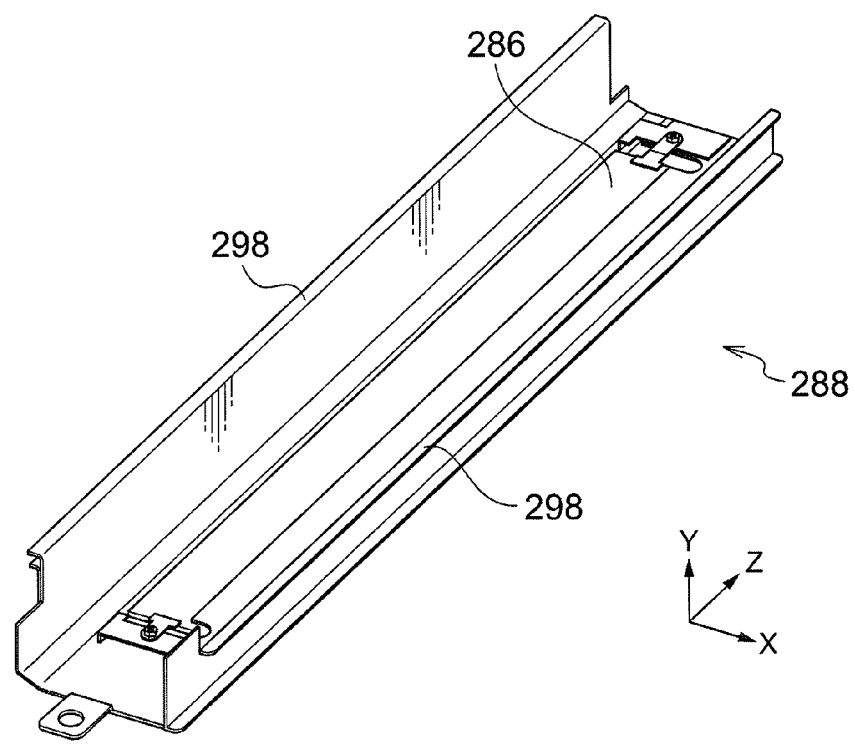
FIG. 17B is a perspective view showing modified examples of the lamp housing and the window cover of the inline sensor according to the exemplary embodiment of the invention.
Figure 18:
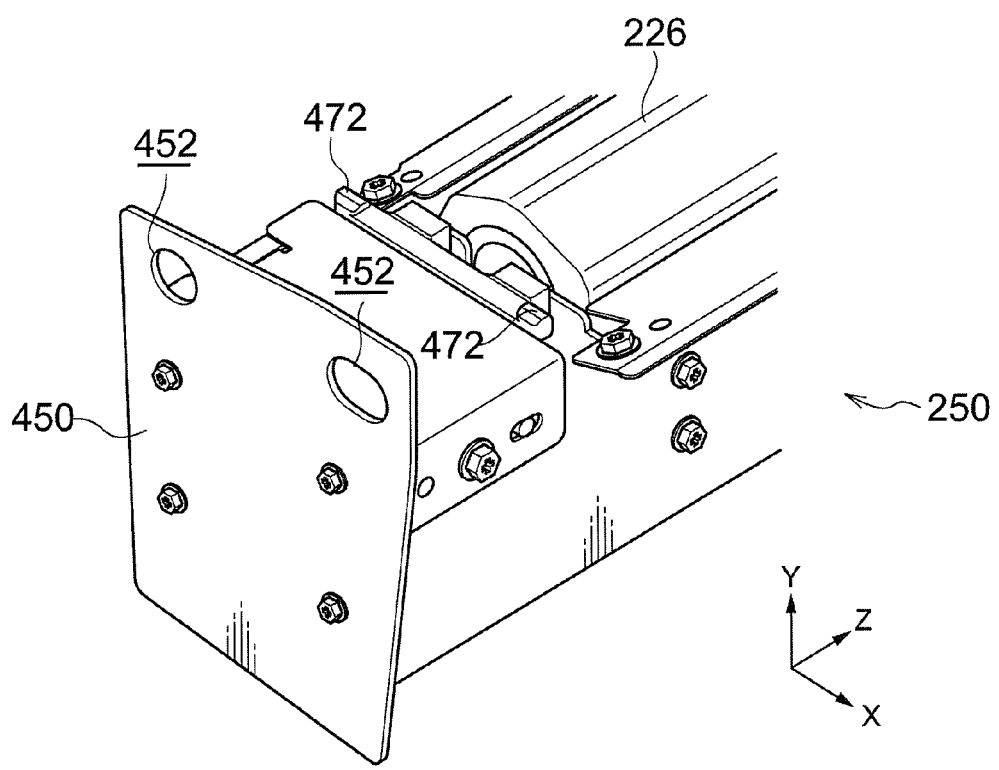
FIG. 18 is a perspective view showing a modified example of an upper surface portion of a lower housing of the inline sensor according to the exemplary embodiment of the invention.

Furthermore, as another modified example of the exemplary embodiment, as shown in FIGS. 17A, 17B, and 18, instead of removing the front plate 462 of the window cover 288, the biasing block 470 may be also provided at the front surface, and the defining portion 472 as datum may be also provided at the upper surface of the front surface of the lower unit 250. In this case, since the window cover 288 at the front surface and the rear surface is pressed against the defining portion 472 as datum by the biasing block 470, the window cover 288 may be disposed to have high positioning precision with respect to the lower unit 250 in the Y direction.

Further, as another modified example, although not shown in the drawings, instead of removing the biasing block 470, the rear plate is also provided at the rear surface of the window cover 288 along the rear cover 424 of the center unit 246, and a positioning hole is provided at the rear plate. When the lower unit 250 is mounted to the center unit 246, the positioning holes 460 of the center unit 246 may be inserted into the positioning pins 458 provided at the rear cover 456 of the lower unit 250, and the positioning hole of the window cover 288 may be also inserted thereinto. In this case, as in the case where the window cover 288 and the lower unit 250 at the front surface are positioned by the common positioning pins 454, the window cover 288 at the rear surface is also positioned by the positioning pins 458 of the lower unit 250, so that the window cover 288 may be disposed to have high positioning precision with respect to the lower unit 250.

(Countermeasure for Stray Light)

As shown in FIG. 3, a baffle 304 is provided inside the lamp housing 284 to surround the optical axis OA above the pair of lamps 212. The baffle 304 includes at least a side wall 304S and a bottom wall 304B. In the exemplary embodiment, the pair of side walls 304S is connected to each other at a pair of front and rear walls (not shown) facing each other in the Z direction. The bottom wall 304B is provided with a lower window 304W where the optical axis OA is incident thereinto. The upper open end of the baffle 304 surrounds a window portion 256A of the imaging system housing 256. Accordingly, a beam traveling along the optical axis OA is incident to the imaging unit 208 through the interior of the baffle 304.

The dimension of the baffle 304 is set so that the beam emitted from the rear side of each lamp 212 does not reach the window portion 256A. That is, the position of the open edge of the lower window 304W is set so that the beam emitted from the rear side of each lamp 212 does not directly reach the window portion 256A. Further, the inclination angle of the side wall 304S with respect to the OA is set so that the beam does not reach the window portion 256A even when the beam emitted from the rear side of each lamp 212 is reflected once.

Plural partition walls 306 are disposed inside the imaging system housing 256 to define a portion other than a light guiding path of the imaging optical system 206. Each partition wall 306 includes an open portion 306A of which the size (upper limit) of the beam passing portion is set in a degree that the diffusion beam reflected from the recording medium P is not narrowed in the Y and Z directions in accordance with the diffusion angle of the beam reflected at the recording medium P.

(Air Flow)

Further, the duct 308 is formed inside the lamp housing 284 by the side wall 304S and the peripheral wall of the lamp housing 284 at one side (in the exemplary embodiment, the upstream side in the transportation direction of the recording medium P). The upper open end of the duct 308 is connected to the duct 265 through the connection port 266B while the lamp housing 284 is mounted to the upper housing 254. Accordingly, the air stream generated by the operation of the fan 270 is also generated inside the lamp housing 284.

An air discharge port 310 is formed at a portion located at the opposite side of the duct 308 in the X direction of the peripheral wall of the lamp housing 284. Accordingly, the air stream from the duct 265 is guided inside the lamp housing 284 by the peripheral wall of the lamp housing 284 and the window cover 288, flows through the first lamp 212A at the upstream side in the transportation direction of the recording medium P and the second lamp 212B at the downstream side therein, and is discharged to the outside of the lamp housing 284 through the air discharge port 310.

Further, a protrusion portion 312 protrudes from the lower end of the side wall 304S constituting the duct 308 so as to prevent the beam emitted from the rear side of the first lamp 212A from reaching the lower window 304W. The protrusion amount of the protrusion portion 312 is set so that the pair of lamps 212 is equally cooled by the air stream flowing toward the pair of lamps 212.

(Beam Quantity Diaphragm Unit)

The beam quantity diaphragm unit 224 includes a side wall 224S, an upper wall 224U, and a lower wall 224L, and the X-Y cross-sectional shape thereof is formed in a C-shape to be opened toward the third mirror 218. A substantially rectangular open portion 314 is formed at the side wall 224S of the beam quantity diaphragm unit 224. Further, a rib 316 is suspended from a free end of the upper wall 224U. The beam quantity diaphragm unit 224 cuts the beam from the recording medium P at a lower edge 314L of the open portion 314 and a lower end 316L of the rib 316, and decreases the quantity of the beam in the Y direction.

One end of the beam quantity diaphragm unit 224 in the length direction reaches the front wall of the imaging system housing 256, and one end of the beam quantity diaphragm unit 224 in the length direction is attached with an operation lever 474 (refer to FIG. 5) through an operation hole formed in the wall.

The beam quantity diaphragm unit 224 rotates with the operation of the operation lever 474 and moves in a posture of gradually decreasing the aperture amount from the initial position where the quantity of the beam is the smallest.

(Jamming Prevention Structure)

Figure 19:
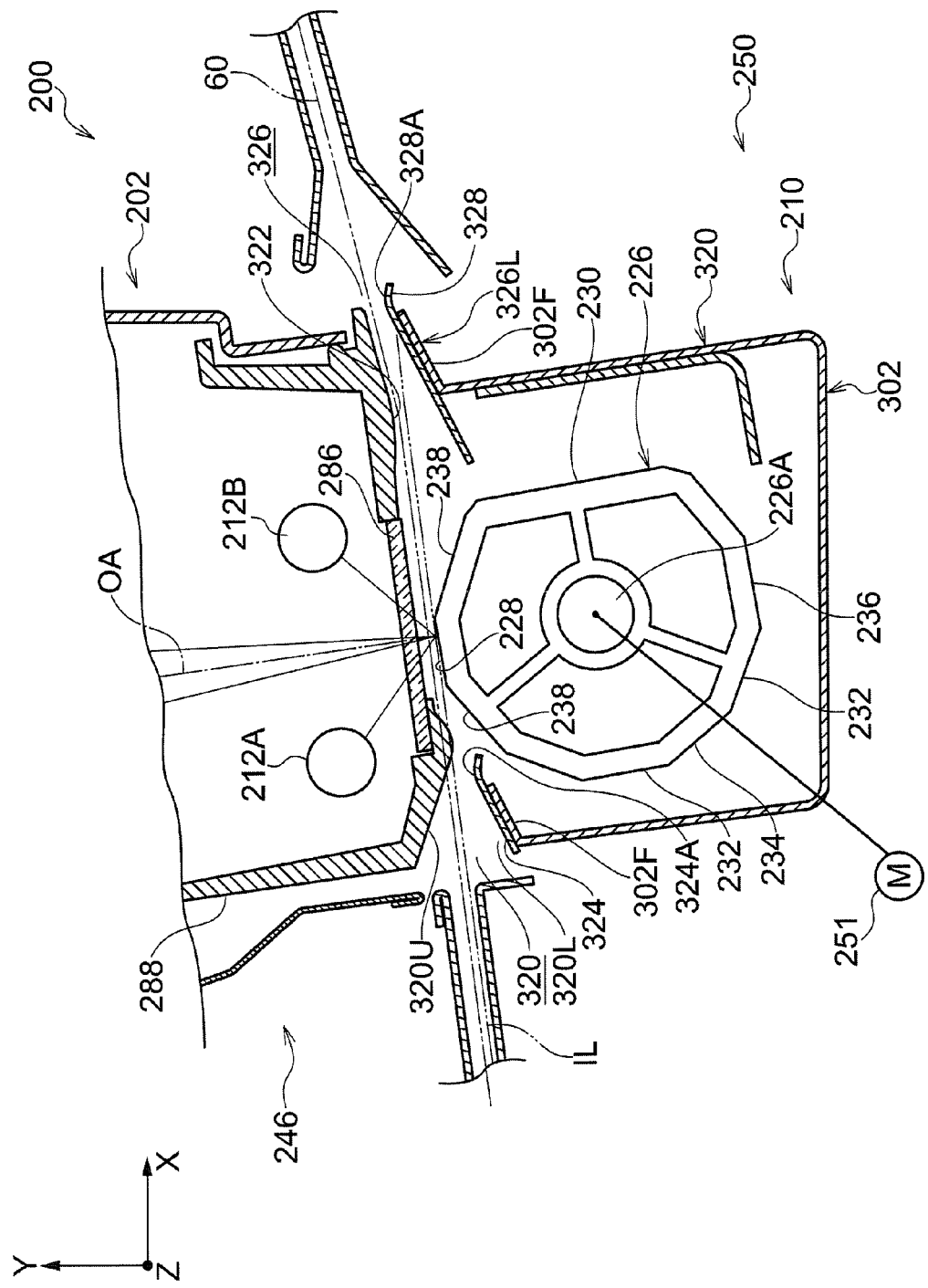
FIG. 19 is a cross-sectional view showing the center unit and the lower unit of the inline sensor according to the exemplary embodiment of the invention about the transportation path of the recording medium.

As shown in FIG. 19, the transportation path 60 between the center unit 246 (the emission unit 202) and the lower unit 250 (the setting unit 210) is elevated toward the downstream side in the transportation direction of the recording medium P. Each corner portion of the window cover 288 and the lower housing 302 is subjected to chamfering or R-chamfering. Accordingly, the inline sensor 200 is provided with an inlet chute 320 as an inducing portion directed toward the upstream side in the transportation direction of the recording medium P.

An upper chute 320U forming the upper portion of the inlet chute 320 is formed as a smooth curved surface which is downwardly convex. When an extension line of a detection reference surface 228 in the Z direction is denoted by IL while the detection reference surface 228 of the reference roll 226 is directed toward the transportation path 60 of the recording medium P, the dimension of the upper chute 320U is set so that the upper chute is interfered with by the extension line IL (so that the protrusion end of the upper chute 320U is located below the extension line IL).

Further, at the downstream side of the window cover 288 in the transportation direction of the recording medium P, further downstream than the window glass 286, a convex portion 322 is formed as a smooth curved surface which is downwardly convex. The convex portion 322 is located above the extension line IL.

The lower chute 320L constituting the lower portion of the inlet chute 320 becomes closer to the reference roll 226 due to the lower chute member 324 fixed to a flange 302F extending inward from the open end of the lower housing 302. The downstream end of the lower chute member 324 in the transportation direction of the recording medium P is formed as a rounded R-portion 324A which is upwardly convex.

On the other hand, an outlet chute 326 is formed between the lower housing 302 and the downstream portion, in the transportation direction of the recording medium P of the convex portion 322. A lower chute 326L constituting the lower portion of the outlet chute 326 is formed by fixing a lower chute member 328 to a flange 302F extending outward from the open end of the lower housing 302. The downstream end of the lower chute member 328 in the transportation direction of the recording medium P is formed as a rounded R-portion 328A which is upwardly convex.

Further, the detection reference surface 228 of the reference roll 226 is directed toward the recording medium P in a posture of being substantially parallel to the window glass 286 when the image detection is performed by the CCD sensor 204. The guide surfaces 238 respectively provided at both sides of the detection reference surface 228 receive the recording medium P from the inlet chute 320, and guide the recording medium P toward the outlet chute 326.

On the other hand, the retreat surface 230 of the reference roll 226 is directed toward the recording medium P in a posture (non-parallel posture) of becoming closer to the window glass 286 approaching the downstream side in the transportation direction of the recording medium P when the image detection is not performed by the CCD sensor 204. The retreat surface 230 is formed as a wide surface that extends from the R-portion 324A of the lower chute member 324 to the vicinity of the outlet chute 326, receives the recording medium P from the inlet chute 320 in the above-described posture, and guides the recording medium P toward the outlet chute 326.

(Operation of Inline Sensor)

As shown in FIG. 3, the inline sensor 200 emits a beam from the pair of lamps 212 to the recording medium P passing between the emission unit 202 and the setting unit 210. The beam reflected from the recording medium P is guided to the imaging unit 208 along the optical axis OA, and forms an image at the CCD sensor 204 by the imaging optical system 206 of the imaging unit 208. The CCD sensor 204 outputs a signal according to the image density for each position of the image to the control device 192 of the image forming apparatus 10. In the control device 192, the image density, the image formation position, and the like are corrected on the basis of the signal from the CCD sensor 204.

On the other hand, when the calibration of the CCD sensor 204 constituting the inline sensor 200 is performed, the motor of the lower unit 250 is first operated so that the white reference surface 232 is directed toward the transportation path 60 of the recording medium P. The CCD sensor 204 is adjusted so that a predetermined signal is output therefrom.

Subsequently, the complex detection surface 236 shown in FIG. 4 is directed toward the transportation path 60 of the recording medium P, and the detection position of the CCD sensor 204 is adjusted so that the gap between the linear portion 240A and the oblique portion 240B of the position adjustment pattern 240 becomes equal to the gap between the linear portion 240C and the oblique portion 240B. Subsequently, the CCD sensor 204 checks whether it is a focus capable of reading the ladder pattern. Further, by using the depth detection pattern 244, it is checked whether the output is within the reference range without depending on the illumination depth degree.

Furthermore, the color reference surface 234 is directed toward the transportation path 60 of the recording medium P. The CCD sensor 204 is adjusted so that a predetermined signal for each color is output therefrom.

As described above, in the exemplary embodiment of the invention, the center unit 246 is positioned with respect to the upper unit 248 by using the positioning pins 426 and 438 and the positioning holes 430 and 436, and the lower unit 250 is positioned with respect to the center unit 246 by using the positioning pins 454 and 458 and the positioning holes 452 and 460. Accordingly, even when the inline sensor 200 includes the upper unit 248, the center unit 246, and the lower unit 250 that are embodied as multiple separate units, the units may be assembled with a good precision of positioning.

Further, the center unit 246 is assembled to the upper unit 248 by using the attachment-detachment guide structure (the sliders 290 and the rails 292), and the lower unit 250 is assembled to the center unit 246 by press-inserting the lower drawer 400 accommodating the lower unit 250 to the second housing 10B of the image forming apparatus 10. Accordingly, even when the inline sensor 200 includes the upper unit 248, the center unit 246, and the lower unit 250 that are embodied as separate multiple units, the units may be easily assembled.

The upper unit 248 may be assembled to the second housing 10B of the image forming apparatus 10 with a good precision of positioning by using the positioning structure (the positioning pins 406 and the positioning holes 410). Accordingly, the center unit 246 and the lower unit 250 may be also assembled to the second housing 10B of the image forming apparatus 10 with a good precision of positioning.

Further, the upper unit 248 may be easily assembled to the second housing 10B of the image forming apparatus 10 by using the attachment-detachment guide structure (the sliders 278 and the rails 402).

Since the joining surface for positioning between the upper unit 248 and the center unit 246 (the joining surface between the front cover 414 and the protrusion portion 434) is disposed closer to the drawing end of the lower drawer 400 than the joining surface for positioning between the center unit 246 and the lower unit 250 (the joining surface between the protrusion surface 453 and the front cover 450), the separated units may be positioned with respect to each other with a good precision and also be easily assembled.

Further, since the attachment-detachment direction of the upper unit 248, the attachment-detachment direction of the center unit 246, and the entrance direction of the lower drawer 400 accommodating the lower unit 250 are aligned with the direction intersecting the transportation direction of the recording medium, the attachment-detachment operation of the upper unit 248, the center unit 246, and the lower unit 250 may be performed at the same side of the image forming apparatus, and the workability may be improved.

Since the image forming apparatus 10 includes the inline sensor 200, the toner image may be detected inside the apparatus.

Furthermore, in the exemplary embodiment, the front surface of the recording medium P is exposed to the beam, but the rear surface of the recording medium P may be exposed to the beam when the transparent recording medium P is used.

Further, the foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection device comprising:

an imaging unit detachably attached to an image forming apparatus and configured to form an image of an incident beam on an image detection unit;

an emission unit detachably attached to the imaging unit and comprising:

a first guided portion that moves to be guided through a first guiding portion of the imaging unit and guiding an attachment-detachment operation of the first guided portion;

a first positioned portion correspondingly positioned with a first positioning portion of the imaging unit when the emission unit is mounted to the imaging unit; and an emission member configured to emit a beam toward a direction of a transportation path at which a medium is transported such that a beam reflected from the medium is incident to the imaging unit; and a setting unit detachably attached to the emission unit, accommodated in a drawing unit of the image forming apparatus, and comprising:

a second positioned portion correspondingly positioned with a second positioning portion provided at the emission unit when the drawing unit is pressure-inserted into the image forming apparatus; and a reference roll configured to set a position on the medium at which the beam is reflected wherein the imaging unit comprises:

a second guided portion that is guided through a second guiding portion of the image forming apparatus and configured to guide an attachment-detachment operation of the second guided portion; and a third positioned portion that is positioned in a third positioning portion of the image forming apparatus when the imaging unit is mounted to the image forming apparatus, and wherein the second guided portion comprises a second slider and the second guiding portion comprises a second rail.

2. The detection device of claim 1, wherein a positional relationship between joining surfaces among the imaging unit, the emission unit, and the setting unit is set, such that the emission unit is disposed closer to a drawing end of the drawing unit than the imaging unit and the setting unit is disposed closer to the drawing end of the drawing unit than the emission unit.

3. The detection device of claim 1, wherein an attachment-detachment direction of the imaging unit, an attachment-detachment direction of the emission unit, and an entrance direction of the drawing unit are aligned with a direction intersecting a transportation direction of the medium.

4. An image forming apparatus comprising:

the detection device according to claim 1;

a guiding portion configured to guide an attachment-detachment operation of the imaging unit; and a positioning portion configured to position the imaging unit when the imaging unit is mounted.

5. The detection device of claim 1, wherein the first guided portion comprises a first slider and the first guiding portion comprises a first rail.

6. The detection device of claim 5, wherein the first positioned portion comprises one of a positioning hole and a positioning pin and the first positioning portion comprises the other one of the positioning hole and the positioning pin.

7. The detection device of claim 1, wherein the reference roll comprises a polygonal cylindrical shape.

8. The detection device of claim 1, wherein the emission unit is configured to be slidably attached and slidably detached from the imaging unit in a rotation axis direction of the reference roll.

* * * * *